US012771508B2

(12) United States Patent
Yu et al.

(10) Patent No.: US 12,771,508 B2
(45) Date of Patent: Oct. 20, 2026

(54) METHOD AND APPARATUS FOR CONFIGURING UPLINK POSITIONING REFERENCE SIGNAL RESOURCE

(71) Applicant: HUAWEI TECHNOLOGIES CO., LTD., Shenzhen (CN)

(72) Inventors: Yingjie Yu, Shanghai (CN); Jinping Hao, Shanghai (CN); Su Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 494 days.

(21) Appl. No.: 18/477,708

(22) Filed: Sep. 29, 2023

(65) Prior Publication Data

US 2024/0022381 A1 Jan. 18, 2024

Related U.S. Application Data

(63) Continuation of application No. PCT/CN2021/084603, filed on Mar. 31, 2021.

(51) Int. Cl.
*H04W 64/00* (2009.01)
*H04L 5/00* (2006.01)

(52) U.S. Cl.
CPC ........... *H04L 5/0051* (2013.01); *H04W 64/00* (2013.01)

(58) Field of Classification Search
None
See application file for complete search history.

(56) References Cited

U.S. PATENT DOCUMENTS

2019/0254061 A1* 8/2019 Manolakos ........... H04L 5/0048

FOREIGN PATENT DOCUMENTS

| | | | |
|---|---|---|---|
| CN | 111586855 | A | 8/2020 |
| CN | 112398624 | A | 2/2021 |
| WO | 2020164339 | A1 | 8/2020 |
| WO | 2021032367 | A1 | 2/2021 |

OTHER PUBLICATIONS

3rd Generation Partnership Project; Technical Specification Group Radio Access Network; NG-RAN; NR Positioning Protocol A (NRPPa) (Release 15), 3GPP TS 38.455 V15.0.0 (Jun. 2018), Technical Specification, total 60 pages.

3rd Generation Partnership Project; Technical Specification Group Radio Access Network; NG Radio Access Network (NG-RAN); Stage 2 functional specification of User Equipment (UE) positioning in NG-RAN (Release 15), 3GPP TS 38.305 V15.0.0 (Jun. 2018), Technical Specification, total 57 pages.

(Continued)

*Primary Examiner* — Suhail Khan

(57) ABSTRACT

This disclosure discloses a method and an apparatus for configuring an uplink positioning reference signal resource, to resolve a problem of an uplink positioning measurement error. The method includes: A first network device receives first information sent by a location management function network element (LMF), where the first information indicates that a first uplink positioning reference signal resource is available or unavailable; and the first network device configures an uplink positioning reference signal resource for a first terminal device based on the first information.

17 Claims, 10 Drawing Sheets

(56) References Cited

OTHER PUBLICATIONS

3rd Generation Partnership Project; Technical Specification Group Radio Access Network; NG Radio Access Network (NG-RAN); Stage 2 functional specification of User Equipment (UE) positioning in NG-RAN (Release 16), 3GPP TS 38.305 V16.2.0 (Sep. 2020), Technical Specification, total 117 pages.

3rd Generation Partnership Project; Technical Specification Group Radio Access Network; NG-RAN; NR Positioning Protocol A (NRPPa) (Release 16), 3GPP TS 38.455 V16.1.0 (Sep. 2020), Technical Specification, total 147 pages.

3GPP TSG-RAN WG2 Meeting #109-e, R2-2001214, "Semi-persistent and aperiodic SRS-for-positioning", Qualcomm Incorporated, Feb. 24-Mar. 6, 2020, total 20 pages.

Extended European Search Report for Application No. 21933807.6 dated Apr. 2, 2024, 8 pages.

* cited by examiner

METHOD AND APPARATUS FOR CONFIGURING UPLINK POSITIONING REFERENCE SIGNAL RESOURCE

CROSS-REFERENCE TO RELATED APPLICATIONS

This application is a continuation of International Application No. PCT/CN2021/084603, filed on Mar. 31, 2021, the disclosure of which is hereby incorporated by reference in its entirety.

TECHNICAL FIELD

This disclosure relates to the field of communication technologies, and in particular, to a method and an apparatus for configuring an uplink positioning reference signal resource.

BACKGROUND

With development of communication technologies, a high-precision positioning technology is gradually determined as an important research project in a 3rd generation partnership project (3GPP) or a 5th generation mobile communication system or 5th generation wireless communication system (5G). The positioning technology includes uplink positioning, and relates to measurement and estimation performed by a base station on a location of a terminal device based on a sounding reference signal (SRS) of the terminal device (user equipment, UE).

Currently, a serving cell of a UE and a plurality of neighboring cells of the serving cell of the UE are combined into one virtualized logical cell, and the UE moves between cells of the logical cell based on an SRS resource configured for the serving cell of the UE, and does not need to reconfigure an SRS, to reduce power consumption of the UE. However, generally, cells included in different logical cells overlap. In an existing SRS resource allocation manner, UEs in different logical cells use a same SRS resource, causing an uplink positioning measurement error.

SUMMARY

This disclosure provides a method and an apparatus for configuring an uplink positioning reference signal resource, to reduce an uplink positioning measurement error and improve positioning precision.

According to a first aspect, this disclosure provides a method for configuring an uplink positioning reference signal resource, including: A first network device receives first information sent by a location management function network element (LMF), where the first information indicates that a first uplink positioning reference signal resource is available or the first uplink positioning reference signal resource is unavailable; and the first network device configures an uplink positioning reference signal resource for a first terminal device based on the first information.

In this embodiment of this disclosure, the LMF indicates, to a network device, whether an uplink positioning reference signal resource is available or unavailable, to assist the network device in configuring an uplink positioning reference signal resource for a terminal device, thereby avoiding a measurement error caused by a resource conflict, and improving positioning precision.

In an optional implementation, when the first information indicates that a plurality of uplink positioning reference signal resources are available or unavailable, the first uplink positioning reference signal resource is any one of the plurality of uplink positioning reference signal resources. The network device may perform configuration based on an available resource that is in the plurality of uplink positioning reference signal resources and that is indicated by the LMF, to simplify configuration selection, and quickly configure the uplink positioning reference signal resource for the terminal device.

In an optional implementation, that a first network device receives first information sent by an LMF includes: The first network device receives a first message from the LMF, where the first message is used to request the first network device to configure an uplink positioning reference signal resource for the first terminal device, and the first message carries the first information. The LMF carries the first information when requesting the network device to configure the uplink positioning reference signal resource for the terminal device, and no additional signaling overheads are required.

In an optional implementation, before that a first network device receives first information sent by an LMF, the method further includes: The first network device sends second information to the LMF, where the second information indicates a second uplink positioning reference signal resource, the second uplink positioning reference signal resource is an uplink positioning reference signal resource that the first network device expects to configure for the first terminal device, and the second uplink positioning reference signal resource includes the first uplink positioning reference signal resource. When configuring the uplink positioning reference signal resource for the terminal device, the network device first queries the LMF about whether a resource that the LMF expects to configure is available, and then configures an available resource. This can avoid a measurement error caused by a resource conflict, and improve positioning precision.

In an optional implementation, if the first uplink positioning reference signal resource is an uplink positioning reference signal resource configured by a second network device for a second terminal device, the first information indicates that the first uplink positioning reference signal resource is unavailable; or if the first uplink positioning reference signal resource is not occupied, the first information indicates that the first uplink positioning reference signal resource is available. An uplink positioning reference signal resource occupied by another terminal device is determined as an unavailable resource, so that an allocated-resource conflict between terminal devices can be avoided, thereby avoiding a measurement error and improving positioning precision.

In an optional implementation, the first information includes configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable. A value of an identifier is used to indicate whether a resource is available or unavailable. In this way, indication is simple, and an information amount is small, so that signaling overheads can be reduced.

In an optional implementation, the first information includes configuration information of the first uplink positioning reference signal resource, and the first information indicates that the first uplink positioning reference signal resource is unavailable. The LMF indicates unavailable resources to the network device, and assists the network device in configuring a resource for the terminal device to avoid the unavailable resource.

In an optional implementation, when the first information includes an available identifier of the first uplink positioning reference signal resource, the first information indicates that the first uplink positioning reference signal resource is available; or when the first information does not include an available identifier of the first uplink positioning reference signal resource, the first information indicates that the first uplink positioning reference signal resource is unavailable. An available identifier indicates that a resource is available. In this way, indication is simple, and an information amount is small, so that signaling overheads can be reduced.

According to a second aspect, this disclosure provides a method for configuring an uplink positioning reference signal resource, including: An LMF sends first information to a first network device, where the first information indicates that a first uplink positioning reference signal resource is available or the first uplink positioning reference signal resource is unavailable, and the first information is used to determine an uplink positioning reference signal resource occupied by a first terminal device.

In this embodiment of this disclosure, the LMF indicates, to a network device, whether an uplink positioning reference signal resource is available or unavailable, to assist the network device in configuring an uplink positioning reference signal resource for a terminal device, thereby avoiding a measurement error caused by a resource conflict, and improving positioning precision.

In an optional implementation, when the first information indicates that a plurality of uplink positioning reference signal resources are available or unavailable, the first uplink positioning reference signal resource is any one of the plurality of uplink positioning reference signal resources.

In an optional implementation, that a location management function network element LMF sends first information to a first network device includes: The LMF sends a first message to the first network device, where the first message is used to request the first network device to configure an uplink positioning reference signal resource for the first terminal device, and the first message carries the first information. The LMF carries the first information when requesting the network device to configure the uplink positioning reference signal resource for the terminal device, and no additional signaling overheads are required.

In an optional implementation, before that a location management function network element LMF sends first information to a first network device, the method further includes: The LMF receives second information from the first network device, where the second information indicates a second uplink positioning reference signal resource, the second uplink positioning reference signal resource is an uplink positioning reference signal resource that the first network device expects to configure for the first terminal device, and the second uplink positioning reference signal resource includes the first uplink positioning reference signal resource.

In an optional implementation, if the first uplink positioning reference signal resource is an uplink positioning reference signal resource configured by a second network device for a second terminal device, the first information indicates that the first uplink positioning reference signal resource is unavailable; or if the first uplink positioning reference signal resource is not occupied, the first information indicates that the first uplink positioning reference signal resource is available. An uplink positioning reference signal resource occupied by the another terminal device is determined as an unavailable resource, so that an allocated-resource conflict between terminal devices can be avoided, thereby avoiding a measurement error and improving positioning precision.

In an optional implementation, the first information includes configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable. A value of an identifier is used to indicate whether a resource is available or unavailable. In this way, indication is simple, and an information amount is small, so that signaling overheads can be reduced.

In an optional implementation, the first information includes configuration information of the first uplink positioning reference signal resource, and the first information indicates that the first uplink positioning reference signal resource is unavailable. The LMF indicates unavailable resources to the network device, and assists the network device in configuring a resource for the terminal device to avoid the unavailable resource.

In an optional implementation, when the first information includes an available identifier of the first uplink positioning reference signal resource, the first information indicates that the first uplink positioning reference signal resource is available; or when the first information does not include an available identifier of the first uplink positioning reference signal resource, the first information indicates that the first uplink positioning reference signal resource is unavailable. An available identifier indicates that a resource is available. In this way, indication is simple, and an information amount is small, so that signaling overheads can be reduced.

According to a third aspect, this disclosure provides a method for configuring an uplink positioning reference signal resource, including: An LMF receives third messages from a plurality of network devices, where the third message of each network device indicates an uplink positioning reference signal resource for the network device; and the LMF sends a fourth message to a terminal device, where the fourth message includes configuration information of an uplink positioning reference signal resource configured for the terminal device.

In this embodiment of this disclosure, the LMF collects uplink positioning reference signal resources of a plurality of network devices in advance, and the LMF may determine whether the uplink positioning reference signal resources are available or unavailable, so that the LMF is responsible for configuring an uplink positioning reference signal resource for the terminal device. This avoids a measurement error caused by a resource conflict, and can improve positioning precision.

In an optional implementation, the uplink positioning reference signal resource configured for the terminal device is a subset of uplink positioning reference signal resources of the plurality of network devices.

In an optional implementation, before that a location management function network element LMF receives third messages from a plurality of network devices, the method further includes: The LMF sends fifth messages to the plurality of network devices, where the fifth message is used to request the uplink positioning reference signal resource for the network device.

In an optional implementation, a first part of the plurality of network devices is located in a first area, and a second part of the plurality of network devices is located in a second area.

In an optional implementation, at least one of the plurality of network devices is located in an overlapping area of the first area and the second area. The LMF configures the uplink positioning reference signal resource for the terminal device, which can ensure that two terminal devices do not occupy a same uplink positioning reference signal resource when logical cells overlap or partially overlap, thereby improving precision of uplink measurement and ensuring uplink positioning precision.

In an optional implementation, the method further includes: sending a positioning measurement request to network devices configured to position the terminal device, where the positioning measurement request includes the configuration information of the uplink positioning reference signal resource configured for the terminal device.

In an optional implementation, the network devices configured to position the terminal device are located in an area corresponding to the terminal device. Alternatively, at least one network device in the network devices configured to position the terminal device is not located in an area corresponding to the terminal device.

According to a fourth aspect, this disclosure provides a method for configuring an uplink positioning reference signal resource, including: A terminal device receives a fourth message from an LMF, where the fourth message includes configuration information of an uplink positioning reference signal resource configured for the terminal device, and the uplink positioning reference signal resource is a subset of uplink positioning reference signal resources of a plurality of network devices.

In this embodiment of this disclosure, the LMF collects uplink positioning reference signal resources of a plurality of network devices in advance, and the LMF may determine whether the uplink positioning reference signal resources are available or unavailable, so that the LMF is responsible for configuring an uplink positioning reference signal resource for the terminal device. This avoids a measurement error caused by a resource conflict, and can improve positioning precision.

According to a fifth aspect, this disclosure provides an apparatus for configuring an uplink positioning reference signal resource, including: a communication module, configured to receive first information sent by an LMF, where the first information indicates that a first uplink positioning reference signal resource is available or the first uplink positioning reference signal resource is unavailable; and a processing module, configured to generate configuration information of an uplink positioning reference signal resource based on the first information, where the configuration information of the uplink positioning reference signal resource is used to configure an uplink positioning reference signal resource for a first terminal device, and the communication module is further configured to send the configuration information of the uplink positioning reference signal resource.

In this embodiment of this disclosure, the LMF indicates, to a network device, whether an uplink positioning reference signal resource is available or unavailable, to assist the network device in configuring an uplink positioning reference signal resource for a terminal device, thereby avoiding a measurement error caused by a resource conflict, and improving positioning precision.

In an optional implementation, the apparatus for configuring an uplink positioning reference signal resource provided in the fifth aspect may be a network device, for example, a first network device.

In an optional implementation, when the first information indicates that a plurality of uplink positioning reference signal resources are available or unavailable, the first uplink positioning reference signal resource is any one of the plurality of uplink positioning reference signal resources. The network device may perform configuration based on an available resource that is in the plurality of uplink positioning reference signal resources and that is indicated by the LMF, to simplify configuration selection, and quickly configure the uplink positioning reference signal resource for the terminal device.

In an optional implementation, the communication module is specifically configured to receive a first message from the LMF, where the first message is used to request the apparatus to configure an uplink positioning reference signal resource for the first terminal device, and the first message carries the first information. The LMF carries the first information when requesting the network device to configure the uplink positioning reference signal resource for the terminal device, and no additional signaling overheads are required.

In an optional implementation, the communication module is further configured to: before receiving the first information sent by the LMF, send second information to the LMF, where the second information indicates a second uplink positioning reference signal resource, the second uplink positioning reference signal resource is an uplink positioning reference signal resource that the apparatus device expects to configure for the first terminal device, and the second uplink positioning reference signal resource includes the first uplink positioning reference signal resource. When configuring the uplink positioning reference signal resource for the terminal device, the network device first queries the LMF about whether a resource that the LMF expects to configure is available, and then configures an available resource. This can avoid a measurement error caused by a resource conflict, and improve positioning precision.

In an optional implementation, if the first uplink positioning reference signal resource is an uplink positioning reference signal resource configured by a second network device for a second terminal device, the first information indicates that the first uplink positioning reference signal resource is unavailable; or if the first uplink positioning reference signal resource is not occupied, the first information indicates that the first uplink positioning reference signal resource is available. An uplink positioning reference signal resource occupied by the another terminal device is determined as an unavailable resource, so that an allocated-resource conflict between terminal devices can be avoided, thereby avoiding a measurement error and improving positioning precision.

In an optional implementation, the first information includes configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable. A value of an identifier is used to indicate whether a resource is available or unavailable. In this way, indication is simple, and an information amount is small, so that signaling overheads can be reduced.

In an optional implementation, the first information includes configuration information of the first uplink positioning reference signal resource, and the first information indicates that the first uplink positioning reference signal resource is unavailable. The LMF indicates unavailable resources to the network device, and assists the network device in configuring a resource for the terminal device to avoid the unavailable resource.

In an optional implementation, when the first information includes an available identifier of the first uplink positioning reference signal resource, the first information indicates that the first uplink positioning reference signal resource is available; or when the first information does not include an available identifier of the first uplink positioning reference signal resource, the first information indicates that the first uplink positioning reference signal resource is unavailable. An available identifier indicates that a resource is available. In this way, indication is simple, and an information amount is small, so that signaling overheads can be reduced.

According to a sixth aspect, this disclosure provides an apparatus for configuring an uplink positioning reference signal resource, including: a processing module, configured to determine first information, where the first information indicates that a first uplink positioning reference signal resource is available or the first uplink positioning reference signal resource is unavailable, and the first information is used to determine an uplink positioning reference signal resource occupied by a first terminal device; and a communication unit, configured to send the first information to a first network device.

In this embodiment of this disclosure, the LMF indicates, to a network device, whether an uplink positioning reference signal resource is available or unavailable, to assist the network device in configuring an uplink positioning reference signal resource for a terminal device, thereby avoiding a measurement error caused by a resource conflict, and improving positioning precision.

In an optional implementation, the apparatus for configuring an uplink positioning reference signal resource provided in the sixth aspect may be a positioning management device, for example, an LMF.

In an optional implementation, when the first information indicates that a plurality of uplink positioning reference signal resources are available or unavailable, the first uplink positioning reference signal resource is any one of the plurality of uplink positioning reference signal resources.

In an optional implementation, the communication module is specifically configured to send a first message to the first network device, where the first message is used to request the first network device to configure an uplink positioning reference signal resource for the first terminal device, and the first message carries the first information. The LMF carries the first information when requesting the network device to configure the uplink positioning reference signal resource for the terminal device, and no additional signaling overheads are required.

In an optional implementation, the communication module is further configured to: before sending the first information to the first network device, receive second information from the first network device, where the second information indicates a second uplink positioning reference signal resource, the second uplink positioning reference signal resource is an uplink positioning reference signal resource that the first network device expects to configure for the first terminal device, and the second uplink positioning reference signal resource includes the first uplink positioning reference signal resource.

In an optional implementation, if the first uplink positioning reference signal resource is an uplink positioning reference signal resource configured by a second network device for a second terminal device, the first information indicates that the first uplink positioning reference signal resource is unavailable; or if the first uplink positioning reference signal resource is not occupied, the first information indicates that the first uplink positioning reference signal resource is available. An uplink positioning reference signal resource occupied by the another terminal device is determined as an unavailable resource, so that an allocated-resource conflict between terminal devices can be avoided, thereby avoiding a measurement error and improving positioning precision.

In an optional implementation, the first information includes configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable. A value of an identifier is used to indicate whether a resource is available or unavailable. In this way, indication is simple, and an information amount is small, so that signaling overheads can be reduced.

In an optional implementation, the first information includes configuration information of the first uplink positioning reference signal resource, and the first information indicates that the first uplink positioning reference signal resource is unavailable. The LMF indicates unavailable resources to the network device, and assists the network device in configuring a resource for the terminal device to avoid the unavailable resource.

In an optional implementation, when the first information includes an available identifier of the first uplink positioning reference signal resource, the first information indicates that the first uplink positioning reference signal resource is available; or when the first information does not include an available identifier of the first uplink positioning reference signal resource, the first information indicates that the first uplink positioning reference signal resource is unavailable. An available identifier indicates that a resource is available. In this way, indication is simple, and an information amount is small, so that signaling overheads can be reduced.

According to a seventh aspect, this disclosure provides an apparatus for configuring an uplink reference signal resource, including: a communication module, configured to receive third messages from a plurality of network devices, where the third message of each network device indicates an uplink positioning reference signal resource for the network device; and a processing module, configured to determine an uplink positioning reference signal resource configured for a terminal device, where the communication module is further configured to send a fourth message to the terminal device, where the fourth message includes configuration information of the uplink positioning reference signal resource configured for the terminal device.

In this embodiment of this disclosure, the LMF collects uplink positioning reference signal resources of a plurality of network devices in advance, and the LMF may determine whether the uplink positioning reference signal resources are available or unavailable, so that the LMF is responsible for configuring an uplink positioning reference signal resource for the terminal device. This avoids a measurement error caused by a resource conflict, and can improve positioning precision.

In an optional implementation, the apparatus for configuring an uplink positioning reference signal resource provided in the seventh aspect may be a positioning management device, for example, an LMF.

In an optional implementation, the uplink positioning reference signal resource configured for the terminal device is a subset of uplink positioning reference signal resources of the plurality of network devices.

In an optional implementation, the communication module is further configured to: before receiving the third messages from the plurality of network devices, send fifth messages to the plurality of network devices, where the fifth message is used to request the uplink positioning reference signal resource for the network device.

In an optional implementation, a first part of the plurality of network devices is located in a first area, and a second part of the plurality of network devices is located in a second area.

In an optional implementation, at least one of the plurality of network devices is located in an overlapping area of the first area and the second area. The LMF configures the uplink positioning reference signal resource for the terminal device, which can ensure that two terminal devices do not occupy a same uplink positioning reference signal resource when logical cells overlap or partially overlap, thereby improving precision of uplink measurement and ensuring uplink positioning precision.

In an optional implementation, the communication module is further configured to send a positioning measurement request to network devices configured to position the terminal device, where the positioning measurement request includes the configuration information of the uplink positioning reference signal resource configured for the terminal device.

In an optional implementation, the network devices configured to position the terminal device are located in an area corresponding to the terminal device. Alternatively, at least one network device in the network devices configured to position the terminal device is not located in an area corresponding to the terminal device.

According to an eighth aspect, this disclosure provides an apparatus for configuring an uplink positioning reference signal resource, including: a communication module, configured to receive a fourth message from an LMF, where the fourth message includes configuration information of an uplink positioning reference signal resource configured for a terminal device, and the uplink positioning reference signal resource is a subset of uplink positioning reference signal resources of a plurality of network devices; and a processing module, configured to determine, based on the configuration information of the uplink positioning reference signal resource, a resource used to send an uplink positioning reference signal, where the communication module is further configured to send the uplink positioning reference signal based on the resource used to send the uplink positioning reference signal.

The communication module may also be referred to as a transceiver module, and the communication module may also be divided into a receiving module and a sending module. The receiving module implements a receiving function, for example, receives the fourth message from the location management function network element LMF. The sending module implements a sending function, for example, sends an uplink positioning reference signal.

In this embodiment of this disclosure, the LMF collects uplink positioning reference signal resources of a plurality of network devices in advance, and the LMF may determine whether the uplink positioning reference signal resources are available or unavailable, so that the LMF is responsible for configuring an uplink positioning reference signal resource for the terminal device. This avoids a measurement error caused by a resource conflict, and can improve positioning precision.

According to a ninth aspect, this disclosure provides a communication apparatus, including a processor, where the processor is coupled to a memory, the memory is configured to store a computer program or instructions, and the processor is configured to execute the computer program or the instructions, to perform the implementation methods in any one of the first aspect to the fourth aspect. The memory may be located inside or outside the apparatus. There are one or more processors.

According to a tenth aspect, this disclosure provides a communication apparatus, including: a logic circuit and an input/output interface, where the input/output interface is configured to input first information sent by an LMF, and the first information indicates that a first uplink positioning reference signal resource is available or the first uplink positioning reference signal resource is unavailable; and the logic circuit is configured to generate configuration information of an uplink positioning reference signal resource based on the first information, where the configuration information of the uplink positioning reference signal resource is used to configure an uplink positioning reference signal resource for a first terminal device; the input/output interface is further configured to output the configuration information of the uplink positioning reference signal resource to the first terminal device.

According to an eleventh aspect, this disclosure provides a communication apparatus, including: a logic circuit and an input/output interface, where the logic circuit is configured to determine first information, the first information indicates that a first uplink positioning reference signal resource is available or the first uplink positioning reference signal resource is unavailable, and the first information is used to determine an uplink positioning reference signal resource occupied by a first terminal device; and the input/output interface is configured to output the first information to a first network device.

According to a twelfth aspect, this disclosure provides a communication apparatus, including a logic circuit and an input/output interface, where the input/output interface is configured to input third messages from a plurality of network devices, and the third message of each network device indicates an uplink positioning reference signal resource for the network device; the logic circuit is configured to determine an uplink positioning reference signal resource configured for a terminal device; and the input/output interface is further configured to output a fourth message to the terminal device, where the fourth message includes configuration information of the uplink positioning reference signal resource configured for the terminal device.

According to a thirteenth aspect, this disclosure provides a communication apparatus, including a logic circuit and an input/output interface, where the input/output interface is configured to input a fourth message from an LMF, the fourth message includes configuration information of an uplink positioning reference signal resource configured for a terminal device, and the uplink positioning reference signal resource is a subset of uplink positioning reference signal resources of a plurality of network devices. The logic circuit is configured to determine, based on the configuration information of the uplink positioning reference signal resource, a resource used to send the uplink positioning reference signal. The input/output interface is further configured to output the uplink positioning reference signal based on the resource of the uplink positioning reference signal.

According to a fourteenth aspect, this disclosure provides a communication system, including a network device configured to perform implementation methods of the first aspect, an LMF configured to perform implementation methods of the second aspect and the third aspect, and a terminal device configured to perform implementation methods of the fourth aspect.

According to a fifteenth aspect, this disclosure further provides a chip system, including a processor, configured to perform implementation methods of any one of the first aspect to the fourth aspect.

According to a sixteenth aspect, this disclosure further provides a computer program product, where the computer product includes a computer program, and when the computer program is run, implementation methods in any one of the first aspect to the fourth aspect are performed.

According to a seventeenth aspect, this disclosure further provides a computer-readable storage medium, where the computer-readable storage medium stores a computer program or instructions, and when the instruction are run on a computer, implementation methods of any one of the first aspect to the fourth aspect are implemented.

For technical effects that can be achieved in the ninth aspect to the seventeenth aspect, refer to technical effects that can be achieved by corresponding technical solutions in the first aspect to the fourth aspect.

DESCRIPTION OF EMBODIMENTS

Figure 1:
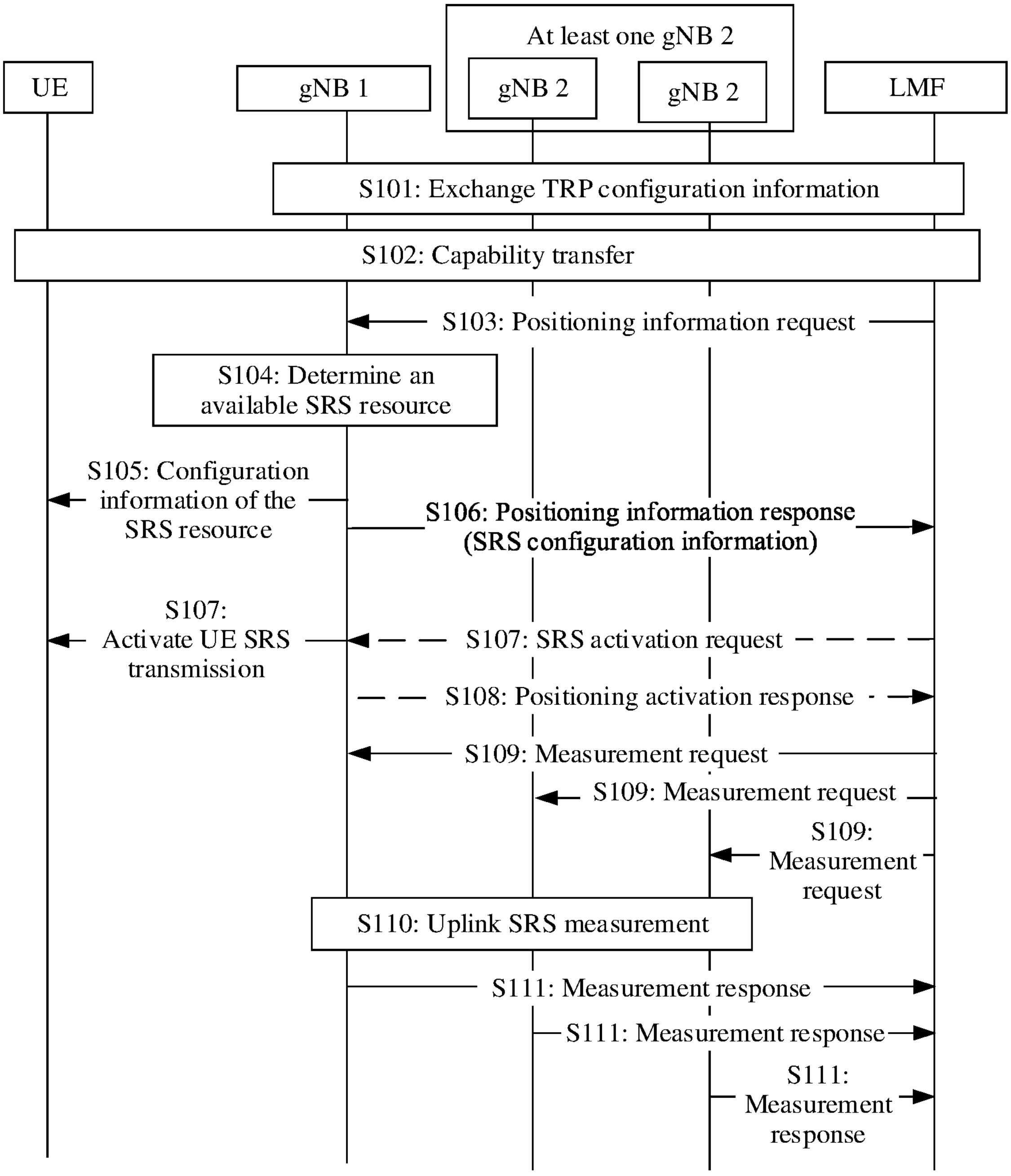
FIG. 1 is a schematic flowchart of UL-TODA positioning.

Embodiments of this disclosure may be applied to a wireless communication network, for example, a 4G network (for example, LTE), a 5G network, or a future network. The following further describes this disclosure in detail with reference to the accompanying drawings.

In the following, some terms in this disclosure are described, to facilitate understanding by a person skilled in the art:

(1) Network Device

The network device may communicate with a terminal device, to provide a wireless access service for the terminal device. The network device may also be referred to as a base station device or a base station. The base station may be in a plurality of forms, for example, a macro base station, a micro base station, a relay station, and an access point. For example, the network device in embodiments of this disclosure may be a base station in new radio (NR). The base station in 5G NR may alternatively be referred to as a transmission reception point (TRP) or a next generation NodeB (gNB). The network device in embodiments of this disclosure may alternatively be a nodeB (NB) in a wideband code division multiple access (WCDMA) system. The network device in embodiments of this disclosure may alternatively be an evolved NodeB (eNB or eNodeB) in a long term evolution (LTE) system.

(2) Terminal Device

The terminal device may also be referred to as user equipment (UE), an access terminal, a terminal unit, a terminal station, a mobile station, a mobile console, a remote station, a remote terminal, a mobile device, a mobile terminal, a terminal, a wireless communication device, a terminal agent, a terminal apparatus, or the like. For example, the terminal device includes a handheld device, a vehicle-mounted device, a wearable device, or a computing device that has a wireless communication function. For example, the terminal may be a mobile phone, a tablet computer, or a computer that has a wireless transceiver function. Alternatively, the terminal device may be a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in a smart city, a wireless terminal in a smart home, or the like.

(3) Core Network

The core network in embodiments of this disclosure may include a core network device that processes and forwards signaling and data of a user. For example, the core network device includes an access and mobility management unit (access and mobility management function, AMF), a session management function (SMF), a user plane gateway, a positioning management device, and the like. The user plane gateway may be a server that has functions such as mobility management, routing, and forwarding specific to user plane data. The user plane gateway, for example, a serving gateway (SGW), a packet data network gateway (PGW), or a user plane network element functional entity (user plane function, UPF), is generally located on a network side. The AMF and the SMF are equivalent to a mobility management entity (MME) in an LTE system. The AMF is mainly responsible for admission, and the SMF is mainly responsible for session management. Certainly, the core network may also include other network elements, which are not listed one by one herein.

The positioning management device has a positioning function, and may also be referred to as a positioning server. The positioning management device in embodiments of this disclosure may include a location management function (LMF) or a location management component (LMC), or may be a local location management function (LLMF) in a network device. This is not limited in embodiments of this disclosure. For ease of description, the following embodiments are described by using an example in which the positioning management device is an LMF.

(4) Logical Cell

The logical cell in embodiments of this disclosure may also be referred to as a user-centric positioning area (UE-Centric Positioning Area, UCPA), or may be referred to as a positioning area (PA) for short. For a terminal device, a logical cell corresponding to the terminal device may be configured by a network device that provides a service for the terminal device (namely, a serving base station), or a logical cell corresponding to the terminal device may be configured by a positioning management device (such as an LMF). A cell included in the logical cell corresponding to the terminal device may be determined by a motion range of the terminal device, and a part of cells in logical cells corresponding to different terminal devices may overlap.

Optionally, the serving base station or the LMF may combine a cell in which the terminal device is located, namely, a serving cell, and a plurality of cells adjacent to the serving cell into one virtualized logical cell. Optionally, the logical cell may alternatively be an administrative area. The positioning management device may obtain current location information of the terminal device, and determine, based on the location information, an administrative area in which the terminal device is located as a positioning area. Optionally, the positioning management device may use cells managed by a first network device and a neighboring network device as a logical cell. When the terminal device moves between cells in the logical cell, the terminal device does not need to release or reconfigure an SRS resource.

(5) Uplink Positioning Reference Signal

The uplink positioning reference signal in embodiment of this disclosure is used for uplink measurement, and a result of the uplink measurement may be used to estimate a location of a terminal device, to implement uplink positioning. The uplink positioning reference signal may be a sounding reference signal (SRS), or another reference signal that can be used for uplink measurement. This is not limited in embodiments of this disclosure.

(6) "A plurality of" mentioned in embodiments of this disclosure means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. In addition, it should be understood that although terms such as "first" and "second" may be used in embodiments of the present invention to describe objects, these objects are not limited by these terms. These terms are merely used to distinguish the objects from each other.

(7) Terms "including", "having", and any other variant thereof mentioned in descriptions of embodiments of this disclosure are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in embodiments of this disclosure, the word "exemplary" or "for example" is used to represent giving an example, an illustration, or a description. Any embodiment or design scheme described as an "example" or "for example" in embodiments of this disclosure should not be explained as being more preferred or having more advantages than another embodiment or design scheme. Exactly, use of the word "example", "for example", or the like, is intended to present a relative concept in a specific manner.

The following briefly describes a related uplink positioning technology. Refer to FIG. 1. FIG. 1 shows a procedure of uplink-time difference of arrival (UL-TODA) positioning in a 5G system. The procedure mainly includes the following steps:

S101: An LMF obtains necessary information of gNBs participating in positioning, where the gNB may also be referred to as a transmission reception point (TRP). That the LMF obtains the necessary information of the gNBs participating in positioning may include exchanging TRP configuration information. Optionally, the gNB participating in positioning includes a serving base station (serving gNB/TRP) of UE and at least one other base station, for example, a base station adjacent to the serving base station (neighour gNB/TRP). For example, in FIG. 1, a gNB 1 is used to represent the foregoing serving base station, and a gNB 2 is used to represent the foregoing another base station. Specifically, FIG. 1 shows two gNBs 2.

S102: Capability transfer between the LMF and the UE is performed, mainly including: The LMF queries the UE for a capability according to an LTE positioning protocol (LPP), and the UE reports the capability to the LMF according to the LPP.

Specifically, the LMF may send a request capabilities message to the UE. The request capabilities message is used to request a positioning capability of the UE. The UE may send positioning capability information to the LMF by using a provide capabilities message. The positioning capability information may include a positioning technology supported by the UE. For example, UL-RTOA is supported.

S103: The LMF requests the serving base station to configure an SRS for the UE by sending an NR positioning protocol annex (NRPPa) message, for example, a positioning information request message.

S104: The serving base station determines an available SRS resource, and generates configuration information of the SRS resource, where the configuration information of the SRS resource is used to configure the SRS resource for the UE.

S105: Send the configuration information of the SRS resource to the UE.

S106: The serving base station reports the SRS configuration information to the LMF by sending an NRPPa message, for example, a positioning information response message.

S107: The LMF requests, by using the serving base station, to trigger the UE to send the SRS, that is, the LMF sends a UE SRS activation request by using the NRPPa to the serving base station. When receiving the UE SRS activation request, the serving base station instructs (or referred to as: activates) the UE to perform SRS transmission.

S108: The serving base station sends an NRPPa message, for example, a positioning activation response message, to the LMF. It should be noted that S107 and S108 are optional steps and may be omitted. That is, after S106 is performed, S109 may be directly performed, and S107 and S18 are ignored.

S109: The LMF sends an NRPPa message, for example, a measurement request message, to the gNBs participating in positioning, where the measurement request includes all information required by the gNBs/TRPs participating in positioning to implement uplink measurement, for example, configuration of an SRS resource.

S110: Each gNB participating in positioning measures the SRS sent by the UE.

S111: Each gNB reports a measurement result to the LMF by sending an NRPPa message, for example, a measurement response message.

Figure 2:
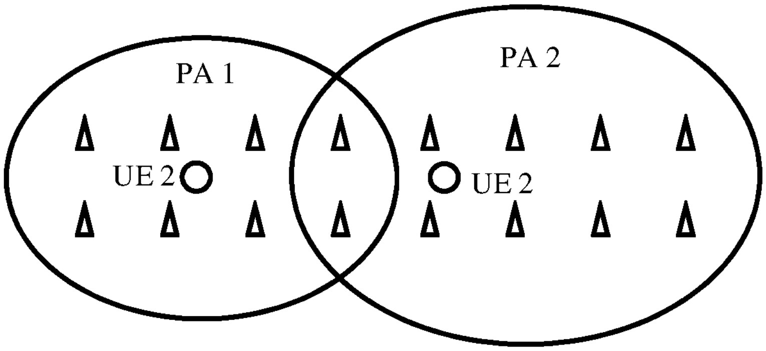
FIG. 2 is a schematic diagram of logical cell division according to an embodiment of this disclosure.

It can be learned from the foregoing procedure that, in the conventional technology, a serving base station configures an SRS resource for a terminal device, and a configuration status of an SRS resource for a terminal device served by another base station is not considered. In a scenario in which different logical cells have cell overlapping, because SRS resources occupied by terminal devices in different logical cells are consistent, a base station participating in positioning cannot distinguish between terminal devices. Consequently, an error occurs in measurement. FIG. 2 is a schematic diagram of logical cell division, where "○" represents a terminal device, and "Δ" represents a cell or a base station in a logical cell. A logical cell PA 1 and a logical cell PA 2 are shown, where PA 1 is a logical cell corresponding to UE 1, and PA 2 is a logical cell corresponding to UE 2. A serving base station of the UE 1 allocates an SRS resource #1 to the UE 1, and the UE 1 sends an SRS in the PA 1 based on the allocated SRS resource #1. If a serving base station of the UE 2 allocates the SRS resource #1 to the UE 2, the UE 2 sends an SRS in the PA2 based on the allocated SRS resource #1. In this case, when a base station located in an overlapping part of the PA 1 and the PA 2 participates in positioning, the base station cannot distinguish between the UE 1 and the UE 2 when performing uplink measurement. As a result, a measurement error is generated, and a requirement for high-precision positioning cannot be met.

In this case, embodiments of this disclosure provide a method for configuring an uplink positioning reference signal resource, to avoid an uplink measurement error by changing a resource configuration manner, thereby improving precision of uplink positioning.

The method for configuring an uplink positioning reference signal resource provided in embodiments of this disclosure may be applied to various communication systems, for example, a long term evolution (LTE) system, a 5th generation (5G) system, such as NR, and a next generation communication system, such as a 6G system. Certainly, technical solutions in embodiments of this disclosure may also be applied to another communication system, provided that the communication system has an uplink positioning requirement for a terminal. In addition, the communication system is further applicable to a future-oriented communication technology. The systems described in the embodiments of this disclosure are intended to describe the technical solutions in embodiments of this disclosure more clearly, and constitute no limitation on the technical solutions provided in embodiments of this disclosure. A person of ordinary skill in the art may learn that, with evolution of network architectures, the technical solutions provided in the embodiments of this disclosure are also applicable to a similar technical problem.

Figure 3:
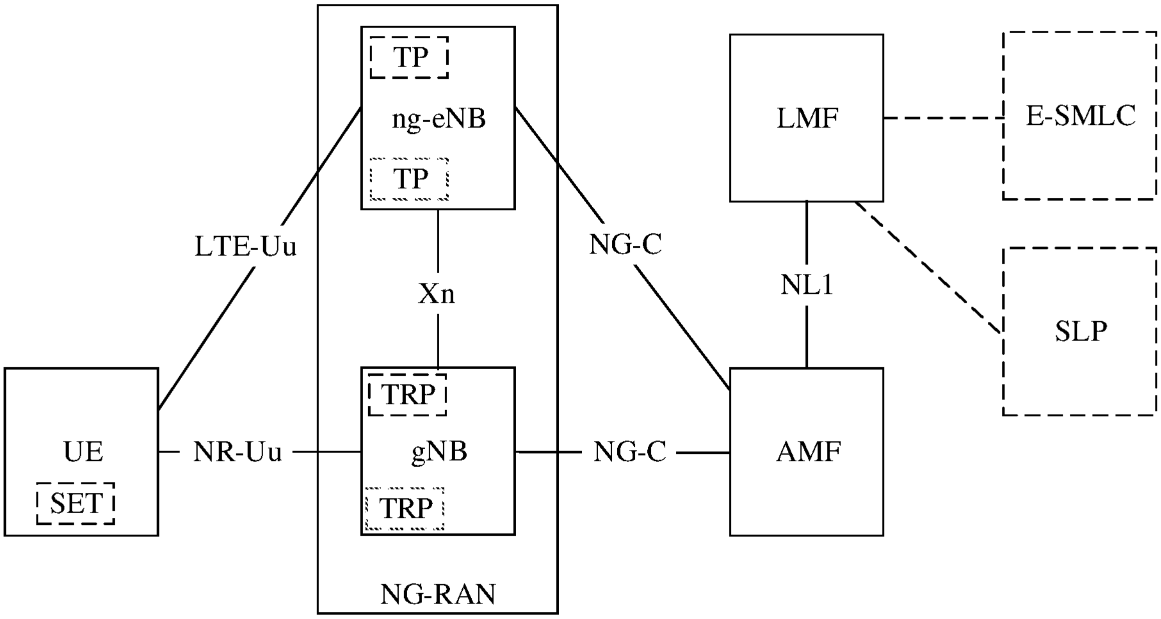
FIG. 3 is a schematic diagram of a network architecture of a communication system according to an embodiment of this disclosure.

FIG. 3 shows a network architecture of a communication system to which embodiments of this disclosure are applicable. FIG. 3 is a schematic diagram of a positioning architecture in an NG-RAN specified in the protocol TS 38.305 V16.2.0. As shown in FIG. 3, network elements/modules mainly include three parts: a next generation radio access network (NG RAN), a terminal, and a core network.

The core network includes a location management function (location management function element, LMF), an access and mobility management function (AMF), a service location protocol (SLP), an evolved serving mobile location center (E-SMLC), and the like. The LMF may also be referred to as a positioning server, and is connected to the AMF. The LMF is connected to the AMF through an NL1 interface.

The NG RAN may include a base station in an NR system, for example, a next generation nodeB (gNB), or a base station in an LTE system, for example, a next generation evolved base station (next generation evolved nodeB, ng-eNB). The gNB and the ng-eNB are connected through an Xn interface, the AMF is connected to the ng-eNB/gNB through an NG-C interface, the UE is connected to the ng-eNB through LTE-Uu, and the UE is connected to the gNB through NR-Uu. The access and mobility management function (access and mobility management unit) is equivalent to a router for communication between the gNB and the LMF. The LMF estimates a location of the UE, and performs positioning calculation on the terminal device based on a measurement result of another network element.

It should be understood that FIG. 3 is only an example for describing the communication system to which embodiments of this disclosure are applicable, and do not specifically limit types, quantities, connection manners, and the like of the network elements included in the communication system to which this disclosure is applicable. For example, the E-SMLC or the SLP is not necessary. For example, the ng-eNB includes one or more transmission points (TP) in some embodiments, the gNB includes one or more transmission points (TRP) in some embodiments, the terminal is referred to as a SUPL enabled terminal (SET) in some embodiments, or includes a SET in some embodiments, where the SUPL is a secure user plane location.

The method for configuring an uplink positioning reference signal resource provided in embodiments of this disclosure may be applied to an NR positioning scenario, for example, an enhanced mobile broadband (eMBB) outdoor scenario, an eMBB indoor scenario, an ultra-reliable and low latency (Ultra-Reliable and Low Latency Communications, URLLC) scenario, a massive machine type of communication (mMTC) scenario, and an internet of things (JOT) scenario.

With reference to Solution 1 to Solution 3, the following describes in detail the method for configuring an uplink positioning reference signal resource provided in embodiments of this disclosure.

Figure 4:
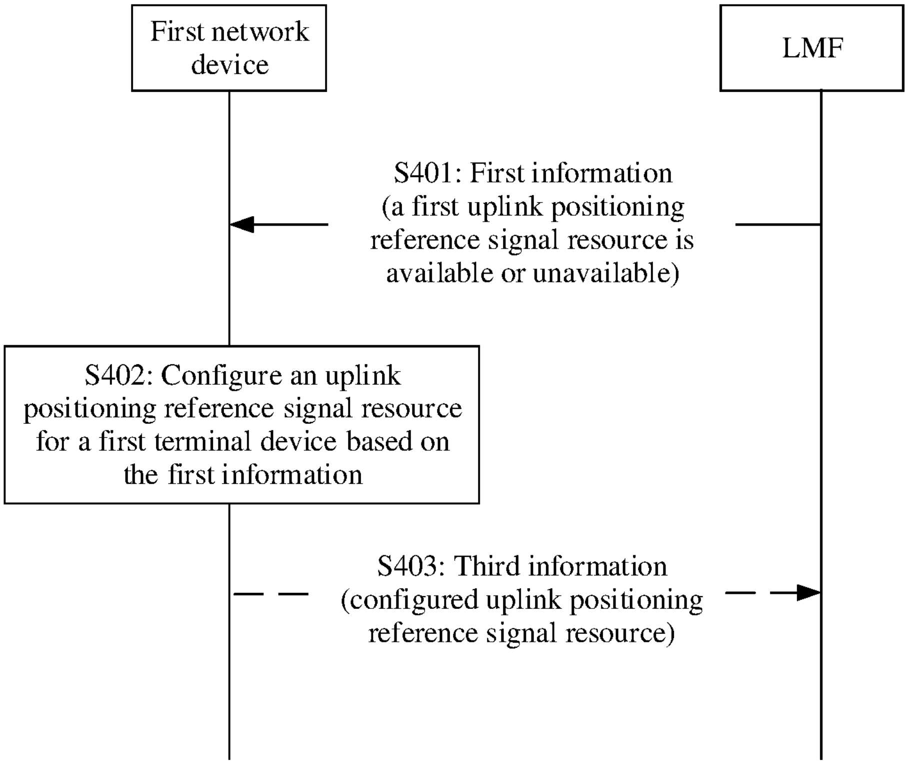
FIG. 4 is a schematic flowchart 1 of a method for configuring a positioning reference signal resource according to an embodiment of this disclosure.

Solution 1:

Refer to FIG. 4. An embodiment of this disclosure provides a method for configuring an uplink positioning reference signal resource, including the following procedure.

S401: An LMF sends first information to a first network device, where the first information indicates that a first uplink positioning reference signal resource is available or the first uplink positioning reference signal resource is unavailable. The first information is used to determine an uplink positioning reference signal resource occupied by a first terminal device. The first terminal device is a terminal device for which a first network device provides an access service. In other words, the first network device is a serving network device of the first terminal device, or is referred to as a serving base station.

Optionally, with regard to the first uplink positioning reference signal resource, the following optional implementations can be considered.

In an optional implementation, the LMF may configure, in a predefined manner, a resource set that can be used to carry a reference signal such as an SRS in an uplink positioning process, and the first uplink positioning reference signal resource belongs to the resource set configured in the predefined manner.

In another optional implementation, the LMF may allocate, for logical cells in which one or more terminal devices are located, an available uplink positioning reference signal resource in each logical cell. For example, an SRS index list may be used to indicate an SRS resource or an SRS sequence available in a logical cell. The first uplink positioning reference signal resource may be any one of available uplink positioning reference signal resources in a logical cell in which the first terminal device is located. Further, the LMF may further send information about a logical cell to the first network device and/or the terminal device, to indicate, to the first network device and/or the terminal device, an available uplink positioning reference signal resource of the logical cell in which the first network device and/or the terminal device are located. For example, the information about the logical cell may include a logical cell index (PA ID) and a cell ID list corresponding to the logical cell. The cell ID list includes IDs of one or more cells that form the logical cell. The cell ID may be implemented by using a physical cell identifier (PCI) and/or a cell global identifier (CGI).

Optionally, the LMF may determine, based on an uplink positioning reference signal resource that is previously reported by the network device and that is allocated to another terminal device, whether the first uplink positioning reference signal resource is available or unavailable, to determine whether the first information indicates that the first uplink positioning reference signal resource is available or whether the first information indicates that the first uplink positioning reference signal resource is unavailable. For example, if the first uplink positioning reference signal resource is an SRS resource configured by a second network device for a second terminal device, the first information indicates that the first uplink positioning reference signal resource is unavailable. Alternatively, if the first uplink positioning reference signal resource is not occupied, the first information indicates that the first uplink positioning reference signal resource is available.

It may be understood that the second terminal device herein may be located in a different logical cell from the first terminal device, or may be located in a same logical cell as the first terminal device. In other words, in this embodiment of this disclosure, a basis for determining whether the uplink positioning reference signal resource is available may be: if an uplink positioning reference signal resource is allocated to a terminal device in another logical cell, the uplink positioning reference signal resource is unavailable; if an uplink positioning reference signal resource is allocated to another terminal device in a same logical cell, the uplink positioning reference signal resource is unavailable; or if an uplink positioning reference signal resource is not allocated, the uplink positioning reference signal resource is available.

Optionally, for content of the first information, refer to any one of the following four manners.

In a first manner, the first information indicates that one or more uplink positioning reference signal resources are available or unavailable, and the first uplink positioning reference signal resource is any one of the one or more uplink positioning reference signal resources.

The first information includes configuration information of each of the one or more uplink positioning reference signal resources and a first identifier associated with the configuration information of each uplink positioning reference signal resource. The first uplink positioning reference signal resource is used as an example. The first information may include configuration information of the first uplink positioning reference signal resource and a first identifier associated with the configuration information. When a value of the first identifier is a first value, the first information indicates that the first uplink positioning reference signal resource is available. When a value of the first identifier is a second value, the first information indicates that the first uplink positioning reference signal resource is unavailable. Optionally, the configuration information of the uplink positioning reference signal resource may include indication information that indicates the uplink positioning reference signal resource, for example, information such as a resource index and a resource number, or may include configuration information of the uplink positioning reference signal resource in time domain and/or frequency domain. For example, the uplink positioning reference signal is an SRS. The first information may include an SRS resource set. The SRS resource set includes configuration information of a plurality of SRS resources and a first identifier associated with the configuration information of each SRS resource. The first identifier is also referred to as an available/unavailable indication. Optionally, "SRS resource list" may be used to represent the first information, "SRS resource set list" may be used to represent the SRS resource set included in the first information, and "SRS config list" may be used to indicate the configuration information of each SRS in the SRS resource set and the first identifier. It may be understood that, in an actual application message or signaling, another description, a field name, or the like may be used to represent the first information and the content of the first information. This is not limited in this embodiment of this disclosure.

The configuration information of any SRS may include one or more of the following content: an index of the SRS resource, frequency domain configuration information corresponding to the SRS resource, and time domain configuration information corresponding to the SRS resource. The frequency domain configuration information includes a transmission comb. Optionally, the transmission comb may be n, indicating that one SRS sequence element is mapped at an interval of n subcarriers within a frequency domain range corresponding to an operating bandwidth of an SRS sequence, where n may be 2, 4, or 8. Optionally, the frequency domain configuration information may further include a parameter related to the transmission comb, for example, a comb offset and/or a cyclic shift. The comb offset represents a subcarrier offset, and the comb offset is less than a value of the transmission comb. The cyclic shift is also referred to as phase rotation. On an SRS basic sequence, phase rotation is added in frequency domain to generate the SRS sequence. Sequences obtained after different phase rotations are performed on a same SRS basic sequence are theoretically orthogonal. Therefore, cyclic shifts may be used to distinguish SRS signals sent by different entries. When the transmission comb is 2, a maximum cyclic shift value is 8. When the transmission comb is 4, a maximum cyclic shift value is 12. The time domain configuration information includes a start symbol location, a symbol quantity, a period, an offset, and the like to which the SRS sequence can be mapped in time domain. A value of the start symbol location, for example, is an integer in a range of [0, 13], and represents a first symbol location used for SRS sequence mapping in one slot. A value of the symbol quantity is 1, 2, 4, 8, or 12, and represents a quantity of time domain symbols that can be occupied by an SRS. The period represents a sending period of an SRS, and the offset represents a time offset relative to a specified time domain reference point. It may be noted that a symbol in time domain may be referred to as an OFDM symbol.

A first identifier associated with configuration information of any SRS resource may be specifically implemented by using "0" or "1". When the first identifier is "0", it indicates that the SRS resource is unavailable; and when the first identifier is "1", it indicates that the SRS resource is available. Alternatively, when the first identifier is "1", it indicates that the SRS resource is unavailable; and when the first identifier is "0", it indicates that the SRS resource is available. The first identifier may alternatively be directly denoted as "available" or "unavailable". If the first identifier is "available", it indicates that the SRS resource is available. Alternatively, if the first identifier is "unavailable", it indicates that the SRS resource is unavailable. It should be noted that, that the first identifier shown above may be "1" or "0", or may be "available" or "unavailable" is used as an example, and does not indicate that a manner of setting the first identifier is limited. The first identifier may alternatively be described in another manner, provided that the first identifier can indicate that an SRS resource associated with the first identifier is available or unavailable.

For example, the uplink positioning reference signal is an SRS. A correspondence between an SRS resource and a resource number may be set in a predefined manner or in a manner of negotiation between the LMF and the network device, so that the LMF and the network device can determine the corresponding SRS resource based on the resource number. In this case, the first information sent by the LMF to the first network device may include an SRS resource number list, where the SRS resource number list includes resource numbers of one or more SRS resources and a first identifier associated with the resource number of each SRS resource, and the first identifier is also referred to as an available/unavailable indication.

The first identifier associated with the resource number of any SRS resource may be specifically implemented by using "0" or "1". When the first identifier is "0", it indicates that the SRS resource is unavailable; and when the first identifier is "1", it indicates that the SRS resource is available. Alternatively, when the first identifier is "1", it indicates that the SRS resource is unavailable; and when the first identifier is "0", it indicates that the SRS resource is available. The first identifier may alternatively be directly denoted as "available" or "unavailable". If the first identifier is "available", it indicates that the SRS resource is available. Alternatively, if the first identifier is "unavailable", it indicates that the SRS resource is unavailable. It should be noted that, that the first identifier shown above may be "1" or "0", or may be "available" or "unavailable" is used as an example, and does not indicate that a manner of setting the first identifier is limited. The first identifier may alternatively be described in another manner, provided that the first identifier can indicate that an SRS resource associated with the first identifier is available or unavailable.

In a second manner, the LMF determines one or more unavailable uplink positioning reference signals, and the first information includes configuration information of the one or more unavailable uplink positioning reference signal resources, but does not include first identifiers associated with these uplink positioning reference signal resources, to indicate to the first network device that these uplink positioning reference signal resources are unavailable. In this manner, the first uplink positioning reference signal resource may be understood as any one of the one or more unavailable uplink positioning reference signal resources. In this case, if the first information sent by the LMF includes the configuration information of the first uplink positioning reference signal resource, it indicates that the first information indicates that the first uplink positioning reference signal resource is unavailable.

In a third manner, for one or more uplink positioning reference signals, the LMF may indicate an available uplink positioning reference signal by using an available identifier, and the first uplink positioning reference signal is used to represent any one of the one or more uplink positioning reference signals. When the first information includes an available identifier of a first uplink positioning reference signal resource, it indicates that the first information sent by the LMF indicates that the first uplink positioning reference signal resource is available. When the first information does not include an available identifier of a first uplink positioning reference signal resource, it indicates that the first information sent by the LMF indicates that the first uplink positioning reference signal resource is unavailable.

In a fourth manner, for one or more uplink positioning reference signals, the LMF may indicate an unavailable uplink positioning reference signal by using an unavailable identifier, and the first uplink positioning reference signal is used to represent any one of the one or more uplink positioning reference signals. When the first information includes an unavailable identifier of the first uplink positioning reference signal resource, it indicates that the first information sent by the LMF indicates that the first uplink positioning reference signal resource is unavailable. When the first information does not include an unavailable identifier of the first uplink positioning reference signal resource, it indicates that the first information sent by the LMF indicates that the first uplink positioning reference signal resource is available.

S402: The first network device configures an uplink positioning reference signal resource for the first terminal device based on the first information.

If the first network device determines, based on the first information, that the first uplink positioning reference signal resource is unavailable, the uplink positioning reference signal resource configured by the first network device for the first terminal device does not include the first uplink positioning reference signal resource. If the first network device determines, based on the first information, that the first uplink positioning reference signal resource is available, optionally, the uplink positioning reference signal resource configured by the first network device for the first terminal device may include the first uplink positioning reference signal resource.

Optionally, the first network device may first generate configuration information of the uplink positioning reference signal resource based on the first information. The configuration information of the uplink positioning reference signal resource is used to configure the uplink positioning reference signal resource for the first terminal device. The first network device sends the configuration information of the uplink positioning reference signal resource to the first terminal device, to configure the uplink positioning reference signal resource for the first terminal device.

S403: The first network device sends third information to the LMF, where the third information indicates the uplink positioning reference signal resource occupied by the first terminal device, that is, the third information indicates the uplink positioning reference signal resource configured by the first network device for the first terminal device. Optionally, the third information may include the configuration information of the uplink positioning reference signal resource occupied by the first terminal device.

Optionally, as an optional procedure, S403 may be performed or may not be performed. For example, S403 may be performed in an application scenario in which the first terminal device needs to be positioned, so that the LMF notifies, to another network device participating in positioning of the first terminal device, the uplink positioning reference signal resource occupied by the terminal device. For example, the LMF may send, based on the third information, the configuration information of the uplink positioning reference signal resource occupied by the first terminal device to the another network device that participates in positioning of the first terminal device. For example, when only the uplink positioning reference signal resource is configured for the first terminal device and subsequent positioning of the first terminal device is not involved, S403 may not be performed. In this embodiment of this disclosure, the first network device obtains an available or unavailable resource of the uplink positioning reference signal by using the LMF, to determine an uplink positioning reference signal resource that can be currently configured for the first terminal device. It is ensured that when logical cells overlap or partially overlap, two terminal devices do not occupy a same uplink positioning reference signal resource, thereby improving precision of uplink measurement and ensuring uplink positioning precision.

Further, the foregoing solution 1 may be applied to an uplink positioning scenario.

In an optional implementation, in S401, the LMF may send, to the first network device, a first message that carries the first information, where the first message is used to request the first network device to configure an uplink positioning reference signal resource for the first terminal device, and the first message may be specifically a positioning information request message.

In an optional implementation, in S403, the first network device may send, to the LMF, a second message that carries the third information, where the second message is used to report, to the LMF, the third information, that is, the uplink positioning reference signal resource configured by the first network device for the first terminal device. The second message may be specifically a positioning information response message.

Figure 5:
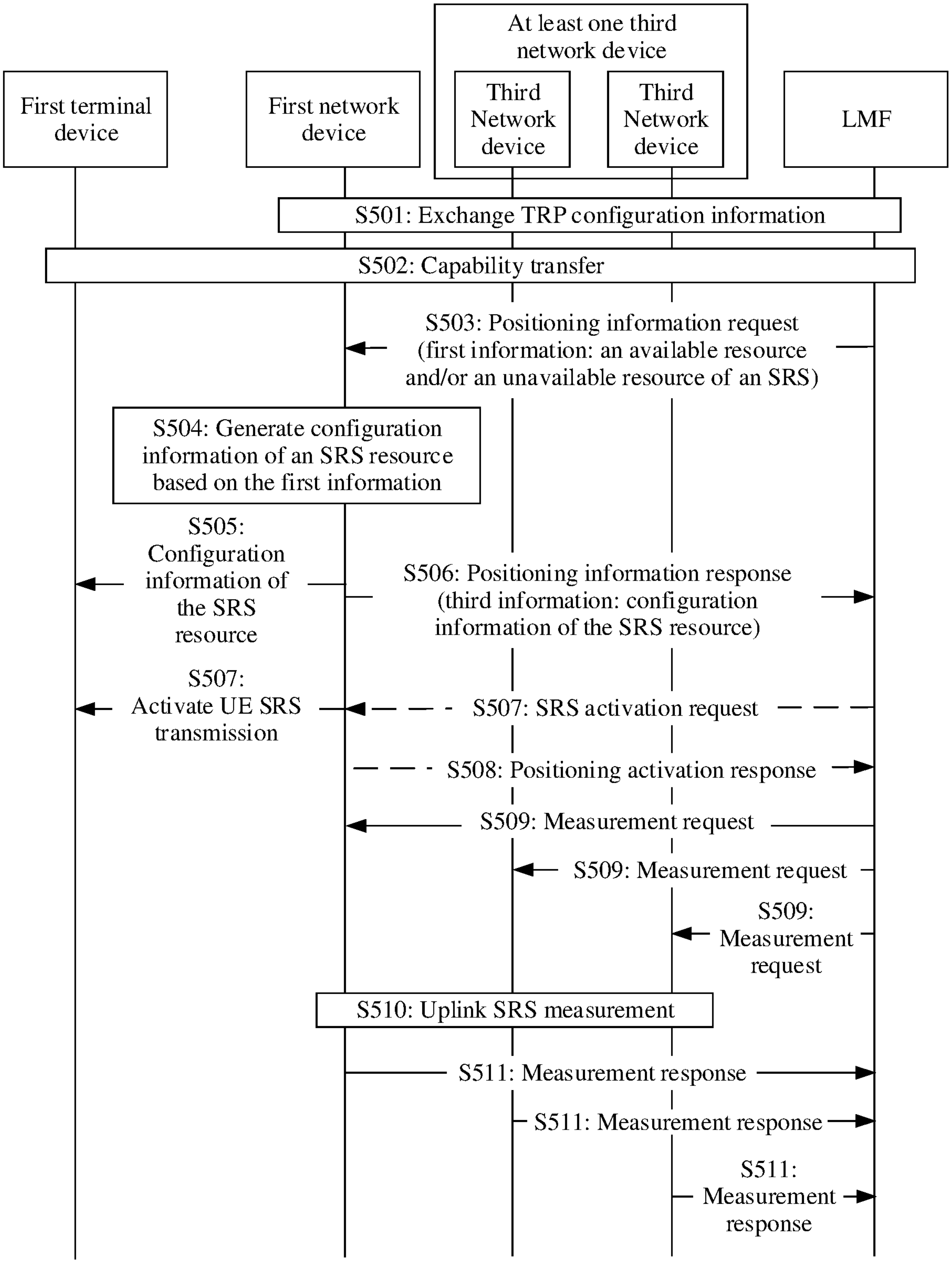
FIG. 5 is a schematic diagram 1 of a positioning procedure according to an embodiment of this disclosure.

For example, the uplink positioning reference signal is an SRS. When requesting the serving base station to configure an SRS resource for the UE, the LMF may indicate an available/unavailable resource of the SRS. FIG. 5 is a schematic diagram of a positioning procedure, which mainly includes the following process.

S501: An LMF obtains necessary information of a network device participating in positioning of a first terminal device, for example, exchange TRP configuration information. The network device participating in positioning of the first terminal device includes a first network device, namely, a serving base station (serving gNB/TRP) of the first terminal device, and at least one third network device. Optionally, the third network device may be a network device adjacent to the first network device (neighour gNB/TRP), or the third network device may be another network device corresponding to a logical cell in which the first terminal device is located. For example, FIG. 1 shows the first network device and two third network devices.

S502: Capability transfer between the LMF and the first terminal device mainly includes: The LMF queries the first terminal device for a capability according to an LTE positioning protocol (LPP), and the first terminal device reports the capability to the LMF according to the LPP.

S503: The LMF sends a first message to the first network device, where the first message carries first information. For example, FIG. 5 specifically shows that the first message is a positioning information request message.

S504: The first network device generates configuration information of an SRS resource based on the first information, where the configuration information of the SRS resource is used to configure the SRS resource for the first terminal device.

S505: Send the configuration information of the SRS resource to the first terminal device.

S506: The first network device sends a second message to the LMF, where the second message carries third information. For example, FIG. 5 specifically shows that the second message is a positioning information response message, and the third information in the positioning information response message includes the configuration information of the SRS resource.

S507: The LMF requests, by using the first network device, to trigger the first terminal device to send an SRS, that is, the LMF sends a UE SRS activation request to the first network device, and when receiving the UE SRS activation request, the first network device activates the first terminal device to perform SRS transmission.

S508: The first network device sends an NRPPa message to the LMF, for example, a positioning activation response message. It should be noted that S507 and S508 are optional steps and may be omitted. That is, after S506 is performed, S509 may be directly performed, and S507 and S58 are ignored.

S509: The LMF sends an NRPPa message, for example, a measurement request message, to the network device participating in positioning of the first terminal device, where the measurement request includes all information required by gNBs/TRPs participating in positioning to implement uplink measurement, for example, configuration of an SRS resource corresponding to the first terminal device.

S510: Each network device participating in positioning measures the SRS sent by the first terminal device.

S511: Each network device participating in positioning reports a measurement result to the LMF by sending an NRPPa message, for example, a measurement response (message.

Figure 6:
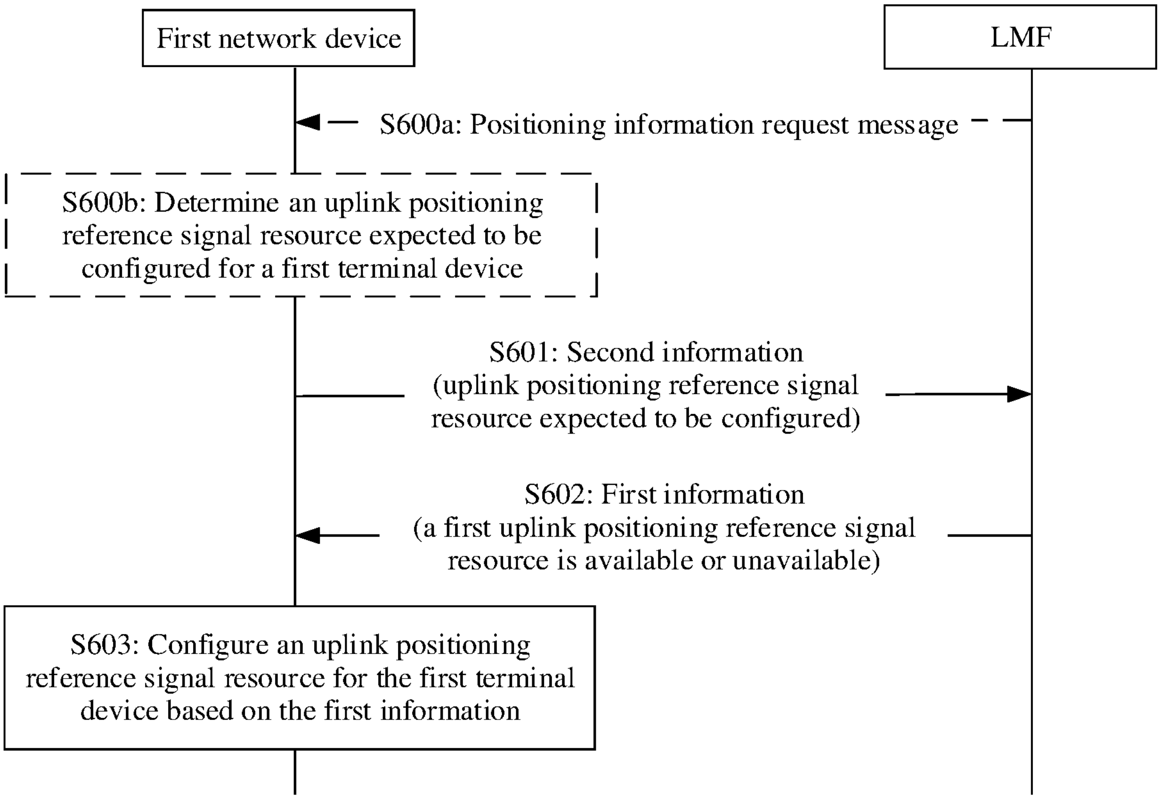
FIG. 6 is a schematic flowchart 2 of a method for configuring a positioning reference signal resource according to an embodiment of this disclosure.

Solution 2:

Refer to FIG. 6. An embodiment of this disclosure provides a method for configuring an uplink positioning reference signal resource, including the following procedure.

S601: A first network device sends second information to an LMF, where the second information indicates a second uplink positioning reference signal resource, the second uplink positioning reference signal resource is an uplink positioning reference signal resource that the first network device expects to configure for a first terminal device, and the second uplink positioning reference signal resource includes the first uplink positioning reference signal resource. For example, the second uplink positioning reference signal resource may include one or more uplink positioning reference signal resources, and the first uplink positioning reference signal resource is any one of the one or more uplink positioning reference signal resources.

S602: The LMF sends first information to the first network device, where the first information indicates that the first uplink positioning reference signal resource is available or the first uplink positioning reference signal resource is unavailable, and the first information is used to determine an uplink positioning reference signal resource occupied by the first terminal device.

Optionally, the LMF may determine, based on an uplink positioning reference signal resource that is previously reported by the network device and that is allocated to another terminal device, whether the first uplink positioning reference signal resource is available or unavailable, to determine whether the first information indicates that the first uplink positioning reference signal resource is available or whether the first information indicates that the first uplink positioning reference signal resource is unavailable. For example, if the first uplink positioning reference signal resource is an SRS resource configured by a second network device for a second terminal device, the first information indicates that the first uplink positioning reference signal resource is unavailable. Alternatively, if the first uplink positioning reference signal resource is not occupied, the first information indicates that the first uplink positioning reference signal resource is available.

It may be understood that the second terminal device herein may be located in a different logical cell from the first terminal device, or may be located in a same logical cell as the first terminal device. In other words, in this embodiment of this disclosure, a basis for determining whether the uplink positioning reference signal resource is available may be: if an uplink positioning reference signal resource is allocated to a terminal device in another logical cell, the uplink positioning reference signal resource is unavailable; if an uplink positioning reference signal resource is allocated to another terminal device in a same logical cell, the uplink positioning reference signal resource is unavailable; or if an uplink positioning reference signal is not allocated, the uplink positioning reference signal is available.

Optionally, for content of the first information, refer to any one of the four manners in S401. Details are not described in this embodiment of this disclosure.

S603: The first network device configures an uplink positioning reference signal resource for the first terminal device based on the first information.

If the first network device determines, based on the first information, that the first uplink positioning reference signal resource is unavailable, the uplink positioning reference signal resource configured by the first network device for the first terminal device does not include the first uplink positioning reference signal resource. If the first network device determines, based on the first information, that the first uplink positioning reference signal resource is available, optionally, the uplink positioning reference signal resource configured by the first network device for the first terminal device may include the first uplink positioning reference signal resource.

Optionally, the first network device may first generate configuration information of the uplink positioning reference signal resource based on the first information. The configuration information of the uplink positioning reference signal resource is used to configure the uplink positioning reference signal resource for the first terminal device. The first network device sends the configuration information of the uplink positioning reference signal resource to the first terminal device, to configure the uplink positioning reference signal resource for the first terminal device.

In this embodiment of this disclosure, the LMF indicates whether the uplink positioning reference signal resource that the first network device expects to allocate is available, so that the first network device does not configure an uplink positioning reference signal resource that causes confusion for the first terminal device, and it is ensured that two terminal devices do not occupy a same uplink positioning reference signal resource when logical cells overlap or partially overlap, thereby improving precision of uplink measurement and ensuring uplink positioning precision.

Further, optionally, before S601 is performed, the following S600*a* and S600*b* processes may be further performed. For example, FIG. 6 shows optional processes S600*a* and S600*b* in a form of a dashed line before S601.

S600*a*: The LMF sends a first message to the first network device, where the first message is used to request the first network device to configure an uplink positioning reference signal resource for the first terminal device. Optionally, as shown in FIG. 6, the first message may be a positioning information request message.

S600*b*: The first network device determines the uplink positioning reference signal resource that the first network device expects to configure for the first terminal device, that is, the first network device determines the second uplink positioning reference signal resource.

Optionally, the first network device may select the second uplink positioning reference signal resource from available uplink positioning reference signal resources in a logical cell in which the first terminal device is located. Alternatively, optionally, if a resource set that carries a reference signal such as an SRS in an uplink positioning process is predefined, the first network device may determine the second upper positioning reference signal resource based on the resource set.

In addition, it should be understood that, in Solution 2, if S600*a* and S600*b* are performed, the first message in S600*a* may also be understood as a trigger condition for the first network device to send the second information to the LMF. If S600*a* and S600*b* are not performed, but S601 to S603 are directly performed, it may be considered that the first network device actively sends the second information to the LMF.

Further, the foregoing solution 2 may be applied to an uplink positioning scenario.

In an optional implementation, in S601, the first network device may send, to the LMF, a second message that carries the second information, where the second message is used to report, to the LMF, the second information, namely, the uplink positioning reference signal resource that the first network device expects to configure for the first terminal device. Corresponding to the positioning information request message in S600*a*, the second message may be specifically a positioning information response message.

Figure 7:
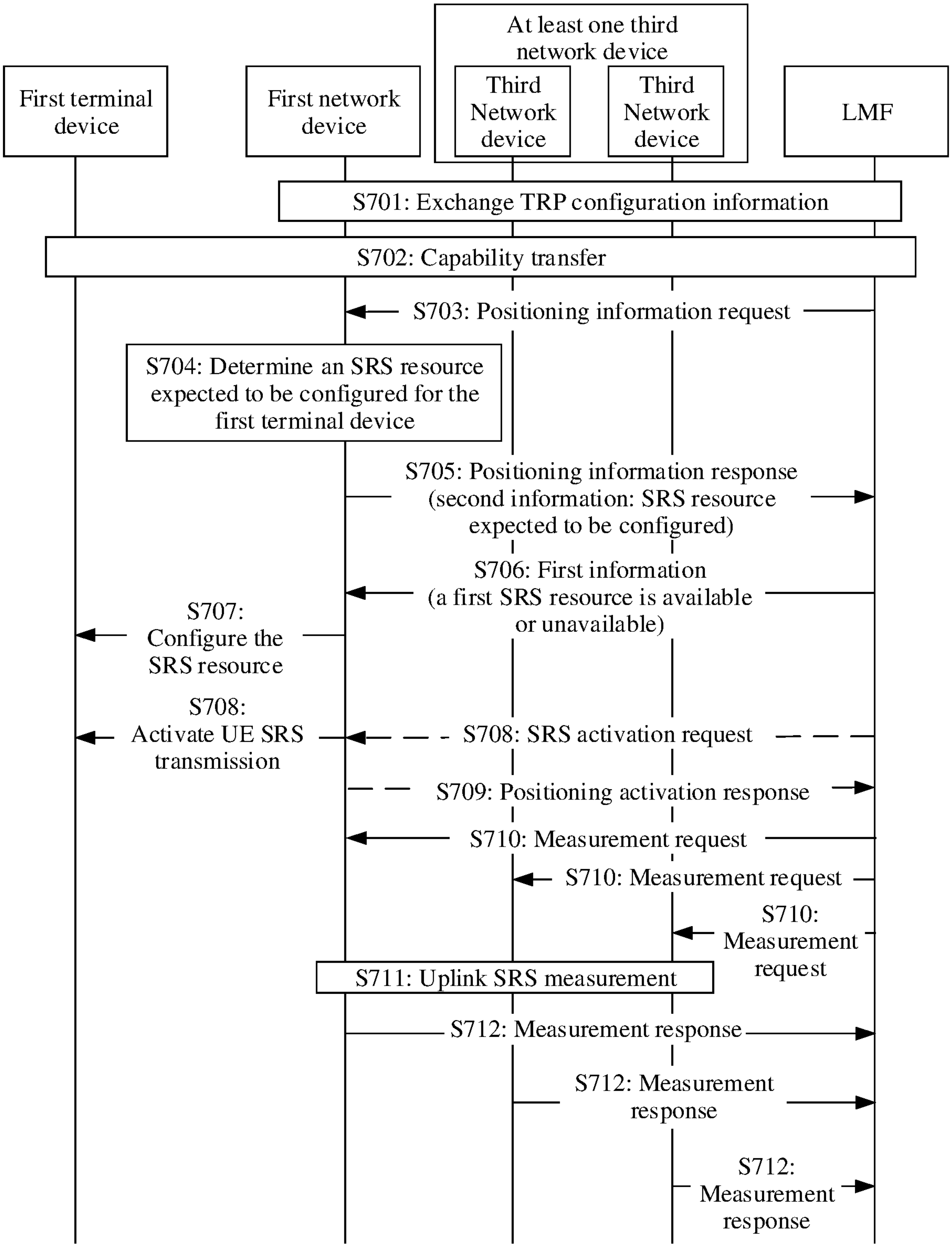
FIG. 7 is a schematic diagram 2 of a positioning procedure according to an embodiment of this disclosure.

For example, an example in which an uplink positioning reference signal is an SRS is used. A serving base station may notify the LMF of an SRS resource that the serving base station expects to configure, and then configure an SRS resource for a terminal device based on an available/unavailable resource of the SRS indicated by the LMF. FIG. 7 is a schematic diagram of a positioning procedure, which mainly includes the following process.

S701: An LMF obtains necessary information of a network device participating in positioning of a first terminal device, for example, exchange TRP configuration information. The network device participating in positioning of the first terminal device includes a first network device, namely, a serving base station (serving gNB/TRP) of the first terminal device, and at least one third network device. Optionally, the third network device may be a network device adjacent to the first network device (neighour gNB/TRP), or the third network device may be another network device corresponding to a logical cell in which the first terminal device is located. For example, FIG. 1 shows a first network device and two third network devices.

S702: Capability transfer between the LMF and the first terminal device mainly includes: The LMF queries the first terminal device for a capability according to an LTE positioning protocol (LPP), and the first terminal device reports the capability to the LMF according to the LPP.

S703: The LMF sends a first message to the first network device. For example, FIG. 7 specifically shows that the first message is a positioning information request message.

S704: The first network device determines an SRS resource that is expected to be configured for the first terminal device, and the SRS resource is denoted as a second SRS resource.

S705: The first network device sends a second message to the LMF, where the second message carries second information. For example, FIG. 7 specifically shows that the second message is a positioning information response message, and the second information indicates an SRS resource that is expected to be configured, or is referred to as a second SRS resource.

S706: The LMF sends first information to the first network device, where the first information indicates that a first SRS resource is available or unavailable. The first SRS resource is a resource in the SRS resource that is expected to be configured (the second SRS resource). Optionally, the first information may also be referred to as SRS resource confirm.

S707: The first network device configures the SRS resource for the first terminal device.

Optionally, this is implemented in the following manner: The first network device may generate configuration information of the SRS resource based on the first information, where the configuration information of the SRS resource is used to configure the SRS resource for the first terminal device. The first network device sends the configuration information of the SRS to the first terminal device.

S708: The LMF requests, by using the first network device, to trigger the first terminal device to send an SRS, that is, the LMF sends a UE SRS activation request to the first network device, and when receiving the UE SRS activation request, the first network device activates the first terminal device to perform SRS transmission.

S709: The first network device sends an NRPPa message to the LMF, for example, a positioning activation response message. It should be noted that S708 and S709 are optional steps and may be omitted. That is, after S706 is performed, S710 may be directly performed, and S708 and S709 are ignored.

S710: The LMF sends an NRPPa message, for example, a measurement request message, to the network device participating in positioning of the first terminal device, where the measurement request includes all information required by gNBs/TRPs participating in positioning to implement uplink measurement, for example, configuration of an SRS resource corresponding to the first terminal device.

S711: Each network device participating in positioning measures the SRS sent by the first terminal device.

S712: Each network device participating in positioning reports a measurement result to the LMF by sending an NRPPa message, for example, a measurement response message.

Figure 8:
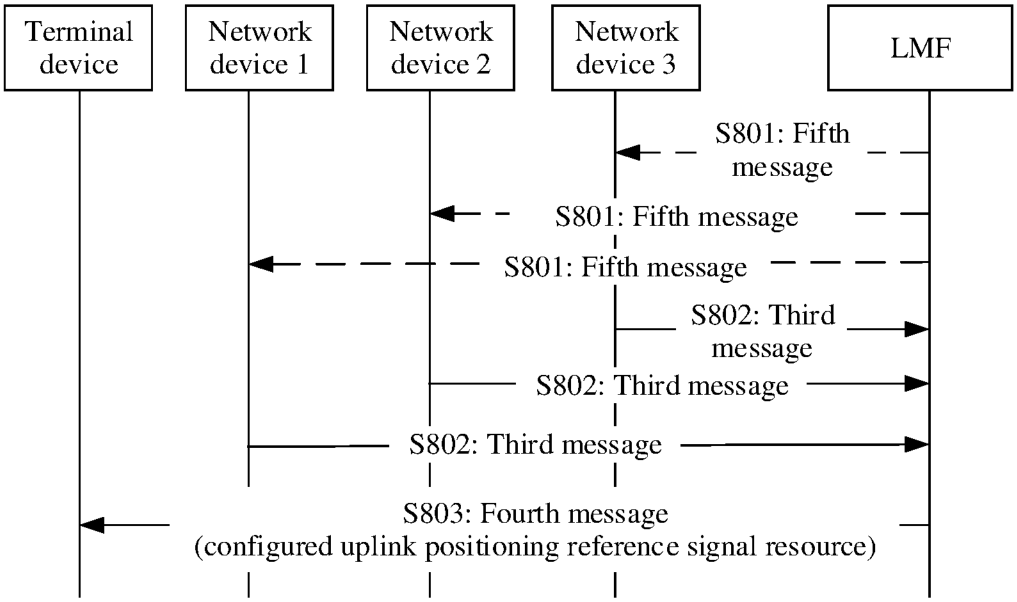
FIG. 8 is a schematic flowchart 3 of a method for configuring a positioning reference signal resource according to an embodiment of this disclosure.

Solution 3:

Refer to FIG. 8. An embodiment of this disclosure provides a method for configuring an uplink positioning reference signal resource, including the following procedure.

S801: A location management function network element LMF sends fifth messages to a plurality of network devices, where the fifth message is used to request an uplink positioning reference signal resource for the network device. The uplink positioning reference signal resource for the network device is an uplink positioning reference signal resource that may be configured by the network device for a terminal device, and may include an uplink positioning reference signal resource that is configured by the network device for the terminal device, and/or an uplink positioning reference signal resource that may be potentially configured by the network device for the terminal device. Optionally, the uplink positioning reference signal resource for the network device may be specifically an uplink positioning reference signal resource list, and the list includes configuration information of one or more uplink positioning reference signal resources. For example, FIG. 8 shows three network devices, such as a network device 1, a network device 2, and a network device 3. In addition, it should be noted that S801 is an optional procedure, that is, S801 may not be performed, and S802 to S803 are directly performed.

Optionally, the LMF may request an uplink positioning reference signal resource for each network device from the plurality of network devices by using an NRPPa message, for example, sending a TRP information request message. That is, the fifth message may be a TRP information request message.

S802: The LMF receives third messages from the plurality of network devices, where the third message of each network device indicates the uplink positioning reference signal resource for the network device.

Optionally, the third message sent by any one of the plurality of network devices includes configuration information of the uplink positioning reference signal resource for the network device.

Optionally, the LMF may integrate an obtained uplink positioning reference signal resource for each network device into one uplink positioning reference signal resource pool, so that the LMF can select, based on the uplink positioning reference signal resource pool, a corresponding uplink positioning reference signal resource for a terminal device that needs to be positioned.

Optionally, a first part of the plurality of network devices is located in a first area, and a second part of the plurality of network devices is located in a second area. The first area and the second area may be understood as logical cells, and a logical cell corresponding to the terminal device that needs to be positioned may be the first area or the second area. The first area and the second area may overlap or do not overlap. Optionally, at least one of the plurality of network devices is located in an overlapping area of the first area and the second area.

Optionally, for the terminal device that needs to be positioned, the plurality of network devices may include a serving base station of the terminal device and at least one other base station, for example, another base station adjacent to the serving base station.

Optionally, each network device may report configuration information of the uplink positioning reference signal resource for each network device to the LMF by using an NRPPa message, for example, a TRP information response message. That is, the fourth message may be a TRP information response message.

S803: The LMF sends a fourth message to the terminal device, where the fourth message includes configuration information of an uplink positioning reference signal resource configured for the terminal device. Optionally, the uplink positioning reference signal resource is a subset of uplink positioning reference signal resources of the plurality of network devices.

In this embodiment of this disclosure, the LMF collects the uplink positioning reference signal resources of the plurality of network devices in advance, and the LMF may determine whether the uplink positioning reference signal resources are available or unavailable. In this way, the LMF is responsible for configuring an uplink positioning reference signal resource for the terminal device, so that when logical cells overlap or partially overlap, two terminal devices do not occupy a same uplink positioning reference signal resource, thereby improving precision of uplink measurement and ensuring uplink positioning precision.

Further, the LMF may further send a positioning measurement request to network devices configured to position the terminal device. The positioning measurement request carries indication information that indicates the uplink positioning reference signal resource configured for the terminal device. Optionally, the positioning measurement request includes the configuration information of the uplink positioning reference signal resource configured for the terminal device.

Optionally, the network devices configured to position the terminal device are located in an area corresponding to the terminal device. Alternatively, at least one network device in the network devices configured to position the terminal device is not located in an area corresponding to the terminal device. It may be understood that the area corresponding to the terminal device may be a logical cell corresponding to the terminal device. Optionally, the logical cell corresponding to the terminal device includes a network device that provides an access service for the terminal device and another network device adjacent to the network device that provides the access service. Different terminal devices correspond to different logical cells, but logical cells corresponding to different terminals may partially overlap or may not overlap.

Further, the foregoing solution 3 may be applied to an uplink positioning scenario.

Figure 9:
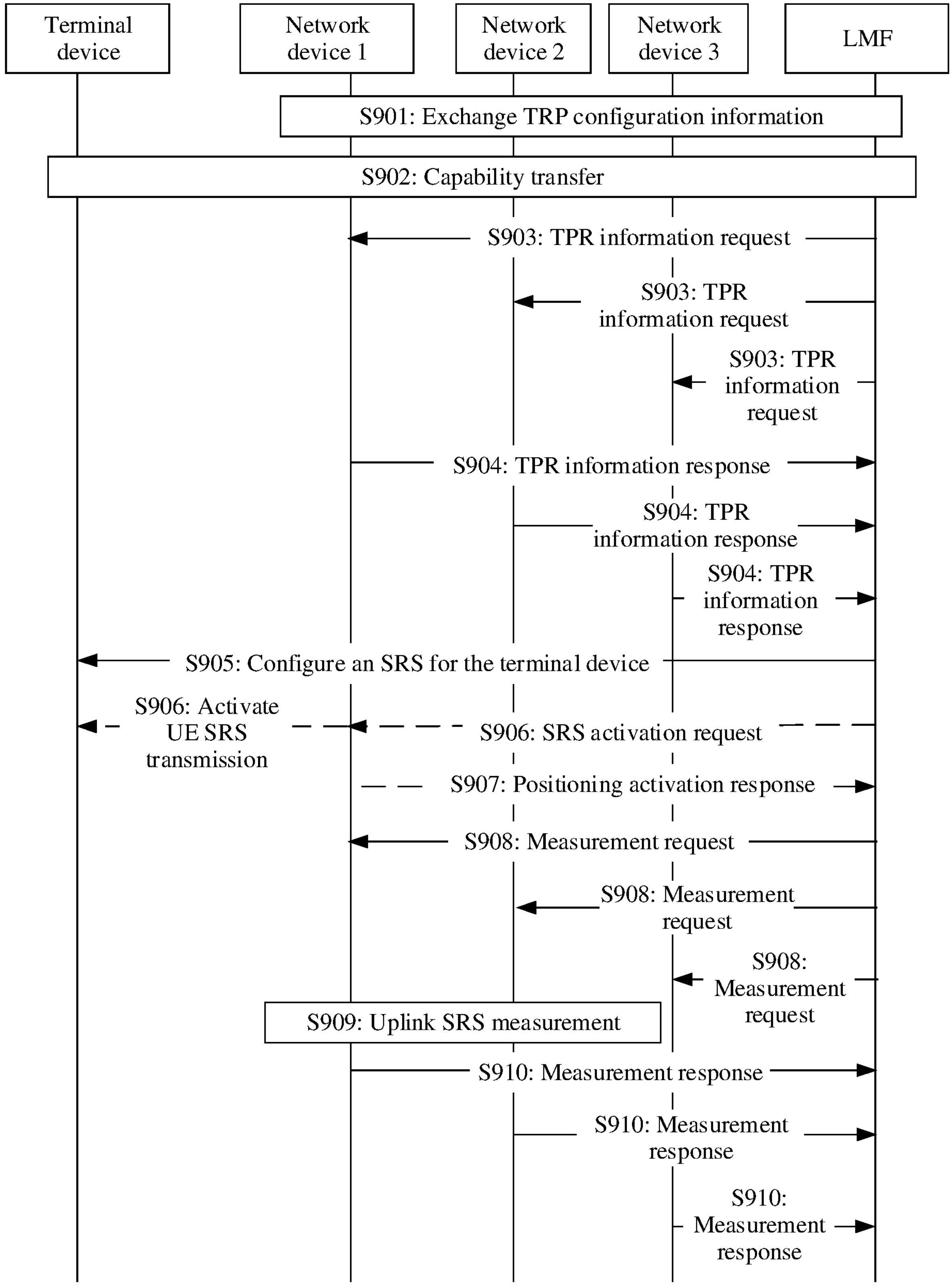
FIG. 9 is a schematic diagram 3 of a positioning procedure according to an embodiment of this disclosure.

For example, an example in which the uplink positioning reference signal is an SRS is used. The LMF may collect SRS resources of a plurality of network devices, so that the LMF configures an SRS resource for the terminal device based on the collected SRS resources. FIG. 9 is a schematic diagram of a positioning procedure, which mainly includes the following process.

S901: An LMF obtains necessary information of a network device participating in positioning of a first terminal device, for example, exchange TRP configuration information. The network device participating in positioning of the first terminal device includes a first network device, namely, a serving base station (serving gNB/TRP) of the first terminal device, and at least one third network device. Optionally, the third network device may be a network device adjacent to the first network device (neighour gNB/TRP), or the third network device may be another network device corresponding to a logical cell in which the first terminal device is located. For example, FIG. 1 shows a first network device and two third network devices.

S902: Capability transfer between the LMF and the first terminal device mainly includes: The LMF queries the first terminal device for a capability according to an LTE positioning protocol (LPP), and the first terminal device reports the capability to the LMF according to the LPP.

S903: The LMF sends fifth messages to a plurality of network devices. For example, FIG. 9 specifically shows three network devices, such as a network device 1, a network device 2, and a network device 3. The network device 1 may be understood as a serving base station that provides an access service for the terminal device. The fifth message is a TRP information request message, which is referred to as a TRP information request for short, and is used to request an SRS resource for each network device.

S904: The plurality of network devices send third messages to the LMF. For example, FIG. 9 specifically shows that the third message is a TRP information response message, and the TRP information response message includes configuration information of the SRS resource for the network device.

S905: The LMF configures an SRS for the terminal device.

Optionally, the LMF sends a fourth message to the terminal device, where the fourth message includes configuration information of an SRS resource configured for the terminal device.

S906: The LMF requests, by using the network device 1, to trigger the terminal device to send the SRS, that is, the LMF sends a UE SRS activation request to the network device 1, and when receiving the UE SRS activation request, the network device 1 activates the terminal device to perform SRS transmission.

S907: The network device 1 sends an NRPPa message to the LMF, for example, a positioning activation response message. It should be noted that S906 and S907 are optional steps and may be omitted. That is, after S905 is performed, S98 may be directly performed, and S906 and S907 are ignored.

S908: The LMF sends an NRPPa message, for example, a measurement request (measurement request) message, to the network device participating in positioning of the terminal device, where the measurement request includes all information required by gNBs/TRPs participating in positioning to implement uplink measurement, for example, configuration of an SRS resource corresponding to the terminal device. For example, network devices participating in positioning of the terminal device include the network device 1, the network device 3, and the network device 3 shown in FIG. 9.

S909: Each network device participating in positioning measures the SRS sent by the first terminal device.

S910: Each network device participating in positioning reports a measurement result to the LMF by sending an NRPPa message, for example, a measurement response message.

In the foregoing embodiments provided in this disclosure, the method provided in the embodiment of this disclosure is described from a perspective of interaction between the terminal, the network device, and the positioning management device. To implement functions in the foregoing method provided in embodiments of this disclosure, a terminal, a network device, and a positioning management device may include hardware structures and/or software modules, to implement the foregoing functions in a form of a hardware structure, a software module, or a combination of the hardware structure and the software module. Whether a function in the foregoing functions is performed by using the hardware structure, the software module, or the combination of the hardware structure and the software module depends on particular application and design constraints of the technical solution.

Figure 10:
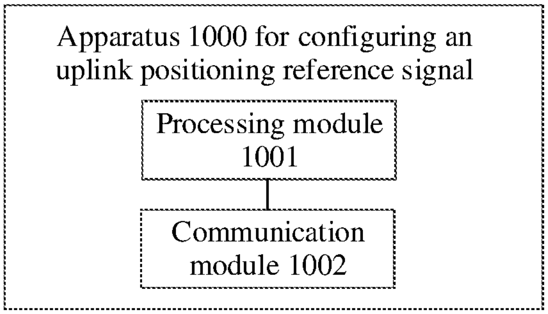
FIG. 10 is a schematic diagram of a structure of an apparatus for configuring a positioning reference signal resource according to an embodiment of this disclosure.

Based on a same concept, refer to FIG. 10. An embodiment of this disclosure provides an apparatus 1000 for configuring an uplink positioning reference signal resource. The apparatus 1000 includes a communication module 1002 and a processing module 1001. The apparatus 1000 may be a first network device, or may be an apparatus that is applied to a first network device and that can support the first network device in performing a method for configuring an uplink positioning reference signal resource. Alternatively, the apparatus 1000 includes a communication module 1002 and a processing module 1001. The apparatus 1000 may be a positioning management device, or may be an apparatus that is applied to a positioning management device and that can support the positioning management device in performing a method for configuring an uplink positioning reference signal resource. Alternatively, the apparatus 1000 may be a terminal device, or may be an apparatus that is applied to a terminal device and that can support the terminal device in performing a method for configuring an uplink positioning reference signal resource. Optionally, the positioning management device is an LMF.

The communication module may also be referred to as a transceiver module, transceiver, a transceiver machine, a transceiver apparatus, or the like. The processing module may also be referred to as a processor, a processing board, a processing unit, a processing apparatus, or the like. It should be understood that the communication module is configured to perform a sending operation and a receiving operation on a first network device side, a positioning management device side, or a terminal device side in the foregoing method embodiments. A component that is in the communication module and that is configured to implement a sending function is considered as a sending unit, and a component that is in the communication module and that is configured to implement a receiving function is considered as a receiving unit. In other words, the communication module includes the receiving unit and the sending unit. When the apparatus 1000 is applied to a first network device, a receiving unit included in the communication module 1002 of the apparatus 1000 is configured to perform a receiving operation on a first network device side, for example, receive data from a terminal device; and a sending unit included in the communication module 1002 of the apparatus 1000 is configured to perform a sending operation on the first network device side, for example, send data to the terminal device. When the apparatus 1000 is applied to a terminal device, a receiving unit included in the communication module 1002 of the apparatus 1000 is configured to perform a receiving operation on a terminal device side, for example, receive data from a first network device. A sending unit included in the communication module 1002 is configured to perform a sending operation on a terminal device side, for example, send data to a first network device. Alternatively, the communication module may be divided into a receiving module and a sending module. The receiving module implements a receiving function, and the sending module implements a sending function. In addition, it should be noted that, if the apparatus is implemented by using a chip/chip circuit, the communication module may be an input/output circuit and/or a communication interface, and performs an input operation (corresponding to the foregoing receiving operation) and an output operation (corresponding to the foregoing sending operation). The processing module is an integrated processor, a microprocessor, or an integrated circuit.

The following describes in detail an implementation in which the apparatus 1000 is applied to the first network device. The apparatus 1000 includes:

a communication module 1002, configured to receive first information sent by an LMF, where the first information indicates that a first uplink positioning reference signal resource is available or the first uplink positioning reference signal resource is unavailable; and a processing module 1001, configured to generate configuration information of an uplink positioning reference signal resource based on the first information, where the configuration information of the uplink positioning reference signal resource is used to configure an uplink positioning reference signal resource for a first terminal device, where the communication module 1002 is further configured to send the configuration information of the uplink positioning reference signal resource In this embodiment of this disclosure, the LMF indicates, to a network device, whether an uplink positioning reference signal resource is available or unavailable, to assist the network device in configuring an uplink positioning reference signal resource for a terminal device, thereby avoiding a measurement error caused by a resource conflict, and improving positioning precision.

In an optional implementation, when the first information indicates that a plurality of uplink positioning reference signal resources are available or unavailable, the first uplink positioning reference signal resource is any one of the plurality of uplink positioning reference signal resources. The network device may perform configuration based on an available resource that is in the plurality of uplink positioning reference signal resources and that is indicated by the LMF, to simplify configuration selection, and quickly configure the uplink positioning reference signal resource for the terminal device.

In an optional implementation, the communication module 1002 is specifically configured to receive a first message from the LMF, where the first message is used to request the apparatus 1000 to configure an uplink positioning reference signal resource for the first terminal device, and the first message carries the first information. The LMF carries the first information when requesting the network device to configure the uplink positioning reference signal resource for the terminal device, and no additional signaling overheads are required.

In an optional implementation, the communication module 1002 is further configured to: before receiving the first information sent by the location management function network element LMF, send second information to the LMF, where the second information indicates a second uplink positioning reference signal resource, the second uplink positioning reference signal resource is an uplink positioning reference signal resource that the apparatus 1000 expects to configure for the first terminal device, and the second uplink positioning reference signal resource includes the first uplink positioning reference signal resource. When configuring the uplink positioning reference signal resource for the terminal device, the network device first queries the LMF about whether a resource that the LMF expects to configure is available, and then configures an available resource. This can avoid a measurement error caused by a resource conflict, and improve positioning precision.

In an optional implementation, if the first uplink positioning reference signal resource is an uplink positioning reference signal resource configured by a second network device for a second terminal device, the first information indicates that the first uplink positioning reference signal resource is unavailable. Alternatively, if the first uplink positioning reference signal resource is not occupied, the first information indicates that the first uplink positioning reference signal resource is available. An uplink positioning reference signal resource occupied by the another terminal device is determined as an unavailable resource, so that an allocated-resource conflict between terminal devices can be avoided, thereby avoiding a measurement error and improving positioning precision.

In an optional implementation, the first information includes configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable. A value of an identifier is used to indicate whether a resource is available or unavailable. In this way, indication is simple, and an information amount is small, so that signaling overheads can be reduced.

In an optional implementation, the first information includes configuration information of the first uplink positioning reference signal resource, and the first information indicates that the first uplink positioning reference signal resource is unavailable. The LMF indicates unavailable resources to the network device, and assists the network device in configuring a resource for the terminal device to avoid the unavailable resource.

In an optional implementation, when the first information includes an available identifier of the first uplink positioning reference signal resource, the first information indicates that the first uplink positioning reference signal resource is available; or when the first information does not include an available identifier of the first uplink positioning reference signal resource, the first information indicates that the first uplink positioning reference signal resource is unavailable. An available identifier indicates that a resource is available. In this way, indication is simple, and an information amount is small, so that signaling overheads can be reduced.

With reference to a first solution and a second solution, the following describes in detail an implementation in which the apparatus 1000 is applied to a positioning management device (for example, an LMF).

In a first solution, the apparatus 1000 includes:

a processing module 1001, configured to determine first information, where the first information indicates that a first uplink positioning reference signal resource is available or the first uplink positioning reference signal resource is unavailable, and the first information is used to determine an uplink positioning reference signal resource occupied by a first terminal device; and a communication unit 1002, configured to send the first information to a first network device.

In this embodiment of this disclosure, the LMF indicates, to a network device, whether an uplink positioning reference signal resource is available or unavailable, to assist the network device in configuring an uplink positioning reference signal resource for a terminal device, thereby avoiding a measurement error caused by a resource conflict, and improving positioning precision.

In an optional implementation, when the first information indicates that a plurality of uplink positioning reference signal resources are available or unavailable, the first uplink positioning reference signal resource is any one of the plurality of uplink positioning reference signal resources.

In an optional implementation, the communication module 1002 is specifically configured to send a first message to the first network device, where the first message is used to request the first network device to configure an uplink positioning reference signal resource for the first terminal device, and the first message carries the first information. The LMF carries the first information when requesting the network device to configure the uplink positioning reference signal resource for the terminal device, and no additional signaling overheads are required.

In an optional implementation, the communication module 1002 is further configured to: before sending the first information to the first network device, receive second information from the first network device, where the second information indicates a second uplink positioning reference signal resource, the second uplink positioning reference signal resource is an uplink positioning reference signal resource that the first network device expects to configure for the first terminal device, and the second uplink positioning reference signal resource includes the first uplink positioning reference signal resource.

In an optional implementation, if the first uplink positioning reference signal resource is an uplink positioning reference signal resource configured by a second network device for a second terminal device, the first information indicates that the first uplink positioning reference signal resource is unavailable. Alternatively, if the first uplink positioning reference signal resource is not occupied, the first information indicates that the first uplink positioning reference signal resource is available. An uplink positioning reference signal resource occupied by the another terminal device is determined as an unavailable resource, so that an allocated-resource conflict between terminal devices can be avoided, thereby avoiding a measurement error and improving positioning precision.

In an optional implementation, the first information includes configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable. A value of an identifier is used to indicate whether a resource is available or unavailable. In this way, indication is simple, and an information amount is small, so that signaling overheads can be reduced.

In an optional implementation, the first information includes configuration information of the first uplink positioning reference signal resource, and the first information indicates that the first uplink positioning reference signal resource is unavailable. The LMF indicates unavailable resources to the network device, and assists the network device in configuring a resource for the terminal device to avoid the unavailable resource.

In an optional implementation, when the first information includes an available identifier of the first uplink positioning reference signal resource, the first information indicates that the first uplink positioning reference signal resource is available; or when the first information does not include an available identifier of the first uplink positioning reference signal resource, the first information indicates that the first uplink positioning reference signal resource is unavailable.

An available identifier indicates that a resource is available. In this way, indication is simple, and an information amount is small, so that signaling overheads can be reduced.

In the second solution, the apparatus 1000 includes:

a communication module 1002, configured to receive third messages from a plurality of network devices, where the third message of each network device indicates an uplink positioning reference signal resource for the network device; a processing module 1001, configured to determine an uplink positioning reference signal resource configured for a terminal device, where the communication module 1002 is further configured to send a fourth message to the terminal device, and the fourth message includes configuration information of the uplink positioning reference signal resource configured for the terminal device.

In this embodiment of this disclosure, the LMF collects uplink positioning reference signal resources of a plurality of network devices in advance, and the LMF may determine whether the uplink positioning reference signal resources are available or unavailable, so that the LMF is responsible for configuring an uplink positioning reference signal resource for the terminal device. This avoids a measurement error caused by a resource conflict, and can improve positioning precision.

In an optional implementation, the uplink positioning reference signal resource configured for the terminal device is a subset of uplink positioning reference signal resources of the plurality of network devices.

In an optional implementation, the communication module 1002 is further configured to: before receiving the third messages from the plurality of network devices, send fifth messages to the plurality of network devices, where the fifth message is used to request the uplink positioning reference signal resource for the network device.

In an optional implementation, a first part of the plurality of network devices is located in a first area, and a second part of the plurality of network devices is located in a second area.

In an optional implementation, at least one of the plurality of network devices is located in an overlapping area of the first area and the second area. The LMF configures the uplink positioning reference signal resource for the terminal device, which can ensure that two terminal devices do not occupy a same uplink positioning reference signal resource when logical cells overlap or partially overlap, thereby improving precision of uplink measurement and ensuring uplink positioning precision.

In an optional implementation, the communication module 1002 is further configured to send a positioning measurement request to network devices configured to position the terminal device, where the positioning measurement request includes the configuration information of the uplink positioning reference signal resource configured for the terminal device.

In an optional implementation, the network devices configured to position the terminal device are located in an area corresponding to the terminal device. Alternatively, at least one network device in the network devices configured to position the terminal device is not located in an area corresponding to the terminal device.

The following describes in detail an implementation in which the apparatus 1000 is applied to a terminal device. The apparatus 1000 includes a communication module 1002, configured to receive a fourth message from a location management function network element LMF, where the fourth message includes configuration information of an uplink positioning reference signal resource configured for a terminal device, and the uplink positioning reference signal resource is a subset of uplink positioning reference signal resources of a plurality of network devices. Optionally, the apparatus 1000 further includes a processing module 1001. The processing module 1001 is configured to obtain the fourth message by using the communication module 1002. The processing module 1001 may be further configured to determine, based on the configuration information of the uplink positioning reference signal resource, a resource used to send the uplink positioning reference signal. The communication module 1002 is further configured to send the uplink positioning reference signal based on the resource used to send the uplink positioning reference signal.

Figure 11:
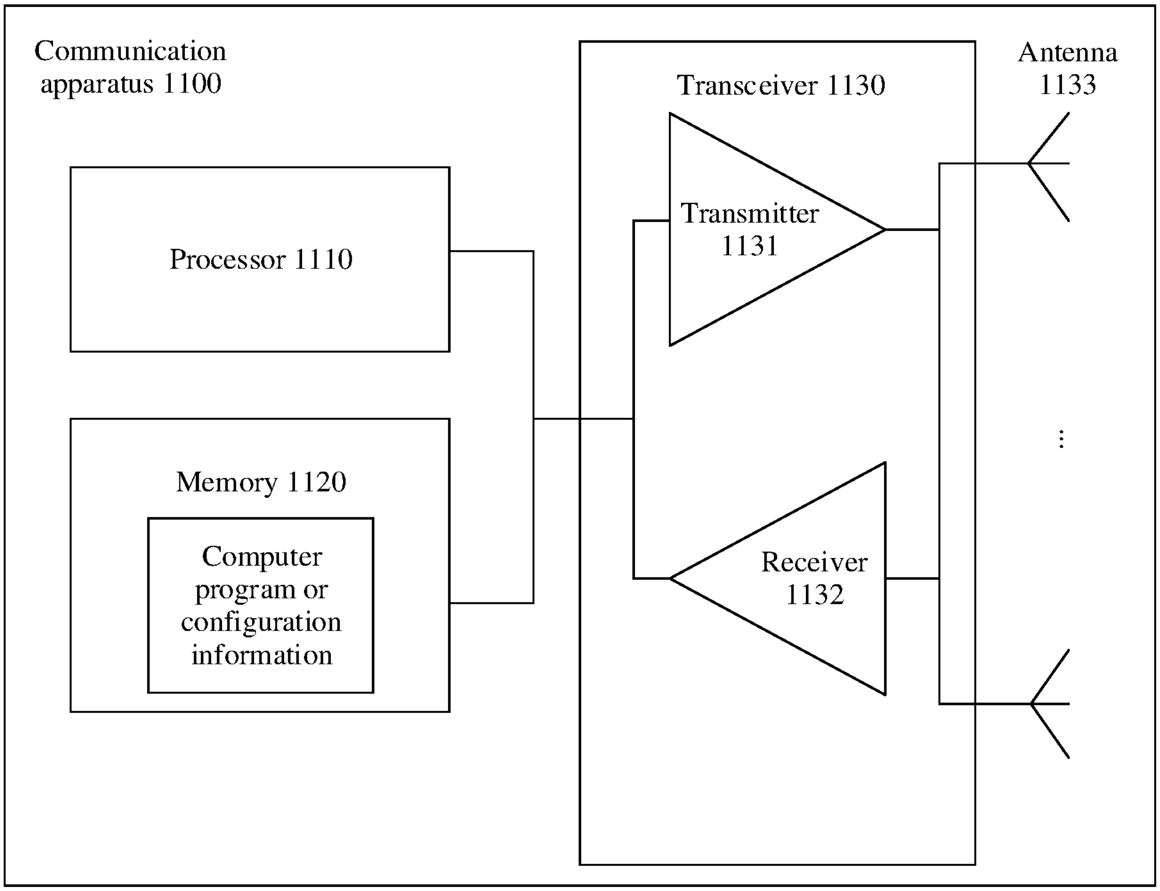
FIG. 11 is a schematic diagram 1 of a structure of a communication apparatus according to an embodiment of this disclosure.

Based on a same concept, as shown in FIG. 11, an embodiment of this disclosure provides a communication apparatus 1100. The communication apparatus 1100 may be a chip or a chip system. Optionally, in this embodiment of this disclosure, the chip system may include a chip, or may include the chip and another discrete device.

The communication apparatus 1100 may include at least one processor 1110. The processor 1110 is coupled to a memory. Optionally, the memory may be located inside the apparatus, or may be located outside the apparatus. For example, the communication apparatus 1100 may further include at least one memory 1120. The memory 1120 stores a computer program, configuration information, a computer program or instructions, and/or data that are necessary for implementing any one of the foregoing embodiments. The processor 1110 may execute the computer program stored in the memory 1120, to complete the method in any one of the foregoing embodiments.

The coupling in this embodiment of this disclosure may be an indirect coupling or a communication connection between apparatuses, units, or modules in an electrical form, a mechanical form, or another form, and is used for information exchange between the apparatuses, the units, or the modules. The processor 1110 may operate in collaboration with the memory 1120. A specific connection medium between a transceiver 1130, the processor 1110, and the memory 1120 is not limited in this embodiment of this disclosure.

The communication apparatus 1100 may further include the transceiver 1130, and the communication apparatus 1100 may exchange information with another device through the transceiver 1130. The transceiver 1130 may be a circuit, a bus, a transceiver, or any other apparatus that can be configured to exchange information, or may be referred to as a signal transceiver unit. As shown in FIG. 11, the transceiver 1130 includes a transmitter 1131, a receiver 1132, and an antenna 1133. In addition, when the communication apparatus 1100 is a chip-type apparatus or circuit, the transceiver in the apparatus 1100 may also be an input/output circuit and/or a communication interface, and may input data (or referred to as receiving data) and output data (or referred to as sending data). The processor is an integrated processor, a microprocessor, or an integrated circuit, and the processor may determine output data based on the input data.

In a possible implementation, the communication apparatus 1100 may be applied to a first network device. Specifically, the communication apparatus 1100 may be the first network device, or may be an apparatus that can support the first network device and implement a function of the first network device in any one of the foregoing embodiments. The memory 1120 stores a necessary computer program, a computer program, or instructions, and/or data for implementing a function of the network device in any one of the foregoing embodiments. The processor 1110 may execute the computer program stored in the memory 1120, to complete the method performed by the network device in any one of the foregoing embodiments. Applied to a first network device, the transmitter 1131 in the communication apparatus 1100 may be configured to send transmission control configuration information/data to a terminal device/positioning management device through the antenna 1133, and the receiver 1132 may be configured to receive, through the antenna 1133, transmission information/data sent by the terminal device/positioning management device.

In a possible implementation, the communication apparatus 1100 may be applied to a positioning management device (for example, an LMF). Specifically, the communication apparatus 1100 may be a positioning management device, or may be an apparatus that can support the positioning management device and implement a function of the positioning management device in any one of the foregoing embodiments. The memory 1120 stores a necessary computer program, a computer program, or instructions, and/or data for implementing a function of the network device in any one of the foregoing embodiments. The processor 1110 may execute the computer program stored in the memory 1120, to complete the method performed by the network device in any one of the foregoing embodiments. Applied to a positioning management device, the transmitter 1131 in the communication apparatus 1100 may be configured to send transmission control configuration information/data to a terminal device/a first network device through the antenna 1133, and the receiver 1132 may be configured to receive, through the antenna 1133, transmission information/data sent by the terminal device/the first network device.

In a possible implementation, the communication apparatus 1100 may be used in a terminal device. Specifically, the communication apparatus 1100 may be a terminal device, or may be an apparatus that can support a terminal device in implementing a function of the terminal device in any one of the foregoing embodiments. The memory 1120 stores a necessary computer program, a computer program, or instructions, and/or data for implementing a function of the terminal device in any one of the foregoing embodiments. The processor 1110 may execute the computer program stored in the memory 1120, to complete the method performed by the terminal device in any one of the foregoing embodiments. Applied to a terminal device, the receiver 1132 in the communication apparatus 1100 may be configured to receive, through the antenna 1133, transmission control configuration information/data sent by a first network device/positioning management device, and the transmitter 1131 may be configured to send the transmission information/data to the first network device/positioning management device through the antenna 1133.

The communication apparatus 1100 provided in this embodiment may be applied to a network device to complete the method performed by the network device; or applied to a positioning management device (such as an LMF) to complete the method performed by the positioning management device; or applied to a terminal device to complete the method performed by the terminal device. Therefore, for technical effects that can be achieved by the computer-readable storage medium, refer to the foregoing method embodiments. Details are not described herein again.

In the embodiment of this disclosure, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this disclosure. The general purpose processor may be a microprocessor or any conventional processor or the like. The steps of the method disclosed with reference to embodiments of this disclosure may be directly performed by a hardware processor, or may be performed by using a combination of hardware in the processor and a software module.

In embodiments of this disclosure, the memory may be a nonvolatile memory, a hard disk drive (HDD) or a solid-state drive (SSD), or may be a volatile memory, for example, a random access memory (RAM). The memory may alternatively be any other medium that can be configured to carry or store expected program code in a form of an instruction or a data structure and that can be accessed by a computer. This is not limited thereto. The memory in the embodiment of this disclosure may alternatively be a circuit or any other apparatus that can implement a storage function, and is configured to store the computer program, the computer program or instructions, and/or the data.

Figure 12:
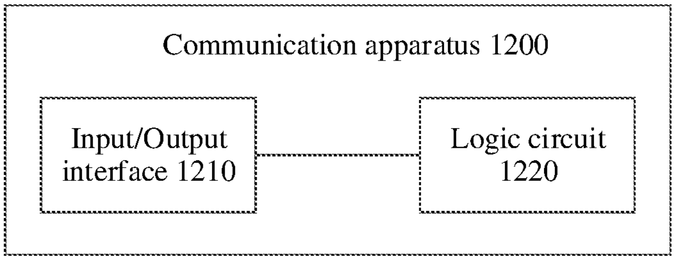
FIG. 12 is a schematic diagram 2 of a structure of a communication apparatus according to an embodiment of this disclosure.

Refer to FIG. 12. An embodiment of this disclosure further provides another communication apparatus 1200. The communication apparatus is a chip system, and includes an input/output interface 1210 and a logic circuit 1220.

When the communication apparatus 1200 is a chip system in the first network device, in some embodiments of this disclosure, the logic circuit and the interface may be configured to perform a function, an operation, or the like performed by the first network device. For example, the input/output interface 1210 is configured to input first information sent by a location management function network element LMF, where the first information indicates that a first uplink positioning reference signal resource is available or the first uplink positioning reference signal resource is unavailable; and the logic circuit 1220 is configured to generate configuration information of an uplink positioning reference signal resource based on the first information, where the configuration information of the uplink positioning reference signal resource is used to configure an uplink positioning reference signal resource for a first terminal device. The input/output interface 1210 is further configured to output the configuration information of the uplink positioning reference signal resource to the first terminal device.

When the communication apparatus 1200 is a chip system in a positioning management device (for example, an LMF), in some embodiments of this disclosure, the logic circuit and the interface may be configured to perform a function, an operation, or the like performed by the positioning management device. For example, the logic circuit 1220 is configured to determine first information, where the first information indicates that a first uplink positioning reference signal resource is available or the first uplink positioning reference signal resource is unavailable, and the first information is used to determine an uplink positioning reference signal resource occupied by a first terminal device. The input/output interface 1210 is configured to output the first information to a first network device. For example, the input/output interface 1210 is configured to input third messages from a plurality of network devices, where the third message of each network device indicates an uplink positioning reference signal resource for the network device; the logic circuit 1220 is configured to determine an uplink positioning reference signal resource configured for a terminal device; and the input/output interface 1210 is further configured to output a fourth message to the terminal device, where the fourth message includes configuration information of the uplink positioning reference signal resource configured for the terminal device.

When the communication apparatus 1200 is a chip system in a terminal device, in some embodiments of this disclosure, the logic circuit and the interface may be configured to perform a function, an operation, or the like performed by the terminal device. The input/output interface 1210 is configured to input a fourth message from a location management function network element LMF, where the fourth message includes configuration information of an uplink positioning reference signal resource configured for the terminal device, and the uplink positioning reference signal resource is a subset of uplink positioning reference signal resources of a plurality of network devices. The logic circuit 1220 is configured to determine, based on the configuration information of the uplink positioning reference signal resource, a resource used to send the uplink positioning reference signal. The input/output interface 1210 is further configured to output the uplink positioning reference signal based on the resource of the uplink positioning reference signal.

The communication apparatus 1200 provided in this embodiment may be applied to a first network device to perform a method performed by the first network device, or applied to a positioning management device to perform the method performed by the positioning management device, or applied to a terminal device to perform the method performed by the terminal device. Therefore, for technical effects that can be achieved by the computer-readable storage medium, refer to the foregoing method embodiments.

Based on the foregoing embodiments, an embodiment of this disclosure further provides a communication system. The communication system includes at least one communication apparatus applied to a network device, at least one communication apparatus applied to a positioning management device, and at least one communication apparatus applied to a terminal device. For technical effects that can be achieved by the computer-readable storage medium, refer to the foregoing method embodiments. Details are not described herein again.

Based on the foregoing embodiments, an embodiment of this disclosure further provides a computer-readable storage medium. The computer-readable storage medium stores a computer program or instructions. When the instructions are executed, the method performed by the network device in any one of the foregoing embodiments is implemented, or the method performed by the positioning management device in any one of the foregoing embodiments is implemented, or the method performed by the terminal device in any one of the foregoing embodiments is implemented. The computer-readable storage medium may include any medium that can store program code, such as a USB flash drive, a removable hard disk, a read-only memory, a random access memory, a magnetic disk, or an optical disc.

To implement functions of the communication apparatuses in FIG. 11 and FIG. 12, an embodiment of this disclosure further provides a chip, including a processor, configured to support the communication apparatus in implementing functions of the first network device, the positioning management device, or the terminal device in the foregoing method embodiments. In a possible design, the chip is connected to a memory or the chip includes a memory, and the memory is configured to store a computer program or instructions and data that are necessary for the communication apparatus.

A person skilled in the art should understand that the embodiments of this disclosure may be provided as a method, a system, or a computer program product. Therefore, this disclosure may use a form of hardware only embodiments, software only embodiments, or embodiments with a combination of software and hardware. In addition, this disclosure may use a form of a computer program product that is implemented on one or more computer-usable storage media (including but not limited to a disk memory, a CD-ROM, an optical memory, and the like) that include computer-usable program code.

This disclosure is described with reference to the flowcharts and/or block diagrams of the method, the device (system), and the computer program product according to the embodiments of this disclosure. It can be understood that computer programs or instructions may be used to implement each procedure and/or each block in the flowcharts and/or the block diagrams and a combination of procedures and/or blocks in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clear that a person skilled in the art can make various modifications and variations to embodiments of this disclosure without departing from the scope of embodiments of this disclosure. This disclosure is intended to cover these modifications and variations provided that they fall within the scope of protection defined by the following claims and their equivalent technologies.

What is claimed is:

1. A method for configuring an uplink positioning reference signal resource, comprising:

sending, by a first network device, second information to a location management function network element (LMF), wherein the second information indicates a second uplink positioning reference signal resource, the second uplink positioning reference signal resource is an uplink positioning reference signal resource that the first network device has determined to configure for a first terminal device;

receiving, by the first network device, first information sent by the LMF, wherein the first information indicates that a first uplink positioning reference signal resource is available or the first uplink positioning reference signal resource is unavailable, wherein the second uplink positioning reference signal resource comprises the first uplink positioning reference signal resource; and configuring, by the first network device, an uplink positioning reference signal resource for the first terminal device based on the first information.

2. The method according to claim 1, wherein when the first information indicates that a plurality of uplink positioning reference signal resources are available or unavailable, the first uplink positioning reference signal resource is any one of the plurality of uplink positioning reference signal resources.

3. The method according to claim 1, wherein the receiving, by a first network device, first information sent by a location management function network element (LMF) comprises:

receiving, by the first network device, a first message from the LMF, wherein the first message indicates a request to the first network device to configure an uplink positioning reference signal resource for the first terminal device, and the first message carries the first information.

4. The method according to claim 1, wherein the first information comprises configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable.

5. The method according to claim 1, wherein the first information comprises configuration information of the first uplink positioning reference signal resource, and the first information indicates that the first uplink positioning reference signal resource is unavailable.

6. The method according to claim 1, wherein when the first information comprises an available identifier of the first uplink positioning reference signal resource, the first information indicates that the first uplink positioning reference signal resource is available; or when the first information does not comprise an available identifier of the first uplink positioning reference signal resource, the first information indicates that the first uplink positioning reference signal resource is unavailable.

7. A method for configuring an uplink positioning reference signal resource, comprising:

receiving, by a location management function network element (LMF), second information from a first network device, wherein the second information indicates a second uplink positioning reference signal resource that the first network device has determined to configure for a first terminal device;

sending, by the LMF, first information to the first network device, wherein the first information indicates that a first uplink positioning reference signal resource is available or the first uplink positioning reference signal resource is unavailable, wherein the second uplink positioning reference signal resource comprises the first uplink positioning reference signal resource, and the first information enables determining an uplink positioning reference signal resource occupied by the first terminal device.

8. The method according to claim 7, wherein when the first information indicates that a plurality of uplink positioning reference signal resources are available or unavailable, the first uplink positioning reference signal resource is any one of the plurality of uplink positioning reference signal resources.

9. The method according to claim 7, wherein the sending, by a location management function network element (LMF), first information to a first network device comprises:

sending, by the LMF, a first message to the first network device, wherein the first message indicates a request to the first network device to configure an uplink positioning reference signal resource for the first terminal device, and the first message carries the first information.

10. The method according to claim 7, wherein if the first uplink positioning reference signal resource is an uplink positioning reference signal resource configured by a second network device for a second terminal device, the first information indicates that the first uplink positioning reference signal resource is unavailable; or if the first uplink positioning reference signal resource is not occupied, the first information indicates that the first uplink positioning reference signal resource is available.

11. The method according to claim 7, wherein the first information comprises configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable.

12. The method according to claim 7, wherein the first information comprises configuration information of the first uplink positioning reference signal resource, and the first information indicates that the first uplink positioning reference signal resource is unavailable.

13. The method according to claim 7, wherein when the first information comprises an available identifier of the first uplink positioning reference signal resource, the first information indicates that the first uplink positioning reference signal resource is available; or when the first information does not comprise an available identifier of the first uplink positioning reference signal resource, the first information indicates that the first uplink positioning reference signal resource is unavailable.

14. A device, comprising:

a processor; and a non-transitory computer-readable storage medium storing a program to be executed by the processor, the program including instructions to:

send second information to a location management function network element (LMF), wherein the second information indicates a second uplink positioning reference signal resource, the second uplink positioning reference signal resource is an uplink positioning reference signal resource that the device has determined to configure for a first terminal device;

receive first information sent by the LMF, wherein the first information indicates that a first uplink positioning reference signal resource is available or the first uplink positioning reference signal resource is unavailable, wherein the second uplink positioning reference signal resource comprises the first uplink positioning reference signal resource; and configure an uplink positioning reference signal resource for a first terminal device based on the first information.

15. The device according to claim 14, wherein when the first information indicates that a plurality of uplink positioning reference signal resources are available or unavailable, the first uplink positioning reference signal resource is any one of the plurality of uplink positioning reference signal resources.

16. The device according to claim 14, wherein program including instructions to:

receive a first message from the LMF, wherein the first message is used to request the device to configure an uplink positioning reference signal resource for the first terminal device, and the first message carries the first information.

17. The device according to claim 14, wherein the first information comprises configuration information of the first uplink positioning reference signal resource and a first identifier associated with the configuration information; and when a value of the first identifier is a first value, the first information indicates that the first uplink positioning reference signal resource is available; or when a value of the first identifier is a second value, the first information indicates that the first uplink positioning reference signal resource is unavailable.

* * * * *